United States Patent
Kim et al.

(10) Patent No.: US 10,104,708 B2
(45) Date of Patent: Oct. 16, 2018

(54) METHODS FOR INITIAL CHANNEL SETTING AND CONNECTION ESTABLISHMENT IN UNMANNED AIRCRAFT SYSTEMS (UAS) CONTROL AND NON-PAYLOAD COMMUNICATION (CNPC)

(71) Applicant: Electronics and Telecommunications Research Institute, Daejeon (KR)

(72) Inventors: Hee Wook Kim, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 49 days.

(21) Appl. No.: 15/371,745

(22) Filed: Dec. 7, 2016

(65) Prior Publication Data

US 2017/0215220 A1  Jul. 27, 2017

(30) Foreign Application Priority Data

Jan. 27, 2016  (KR) .................. 10-2016-0010025

(51) Int. Cl.
*H04W 76/14* (2018.01)
*H04W 76/11* (2018.01)
(Continued)

(52) U.S. Cl.
CPC .......... *H04W 76/14* (2018.02); *H04W 16/14* (2013.01); *H04W 24/02* (2013.01); *H04W 76/11* (2018.02);
(Continued)

(58) Field of Classification Search
CPC ..... H04W 76/14; H04W 76/11; H04W 24/02; H04W 16/14; H04W 76/023;
(Continued)

(56) References Cited

U.S. PATENT DOCUMENTS 9,590,720 B2 * 3/2017 Jalali .................. H04B 7/18504
9,596,020 B2 * 3/2017 Frolov ............... H04B 7/18506
(Continued)

FOREIGN PATENT DOCUMENTS

KR  1020150117879 A  10/2015

OTHER PUBLICATIONS

Jim Griner, "UAS Control and Non-Payload Communication (CNPC) System Development and Testing," I-CNS Plenary, Apr. 22, 2015, pp. 1-21.

*Primary Examiner* — Brian T O Connor
(74) *Attorney, Agent, or Firm* — William Park & Associates Ltd.

(57) ABSTRACT

Disclosed are methods for communication channel setting and connection establishment in a new UAS CNPC system which can dynamically allocate a UA controlling a communication frequency resource to efficiently operate multiple UAs to channels in a limited UA control dedicated frequency band in a national airspace and be applied even to a next-generation P2MP type CNPC system, in order to stably operate the UA and extend the demand of the UA. That is, the present invention has been made in an effort to provide a method for setting a UA controlling communication channel between a ground radio station (GRS) and an unmanned aircraft (UA), which is used for supporting dynamic allocation and management of a UA controlling communication channel and a procedure for establishing connection of a UA controlling communication channel among a ground control system (GCS), the ground radio station (GRS), and the unmanned aircraft (UA).

20 Claims, 12 Drawing Sheets

(51) Int. Cl.
*H04W 16/14* (2009.01)
*H04W 24/02* (2009.01)
*H04B 7/185* (2006.01)
*H04W 84/10* (2009.01)

(52) U.S. Cl.
CPC ....... *H04B 7/18506* (2013.01); *H04W 84/105* (2013.01)

(58) Field of Classification Search
CPC .............. H04W 76/021; H04W 84/105; H04B 7/18506; H04B 7/155
See application file for complete search history.

(56) References Cited

U.S. PATENT DOCUMENTS

| | | | |
|---|---|---|---|
| 9,798,329 B2* | 10/2017 | Shattil | B64C 39/024 |
| 2004/0125784 A1 | 7/2004 | Lee et al. | |
| 2009/0164638 A1 | 6/2009 | Jang et al. | |
| 2015/0043493 A1* | 2/2015 | Gajanan | H04W 16/14 370/329 |
| 2015/0319769 A1* | 11/2015 | Grabowsky | H04W 72/1236 455/510 |
| 2017/0161968 A1* | 6/2017 | Xie | G07C 5/008 |
| 2018/0123678 A1* | 5/2018 | Frolov | H04B 7/18506 |

\* cited by examiner

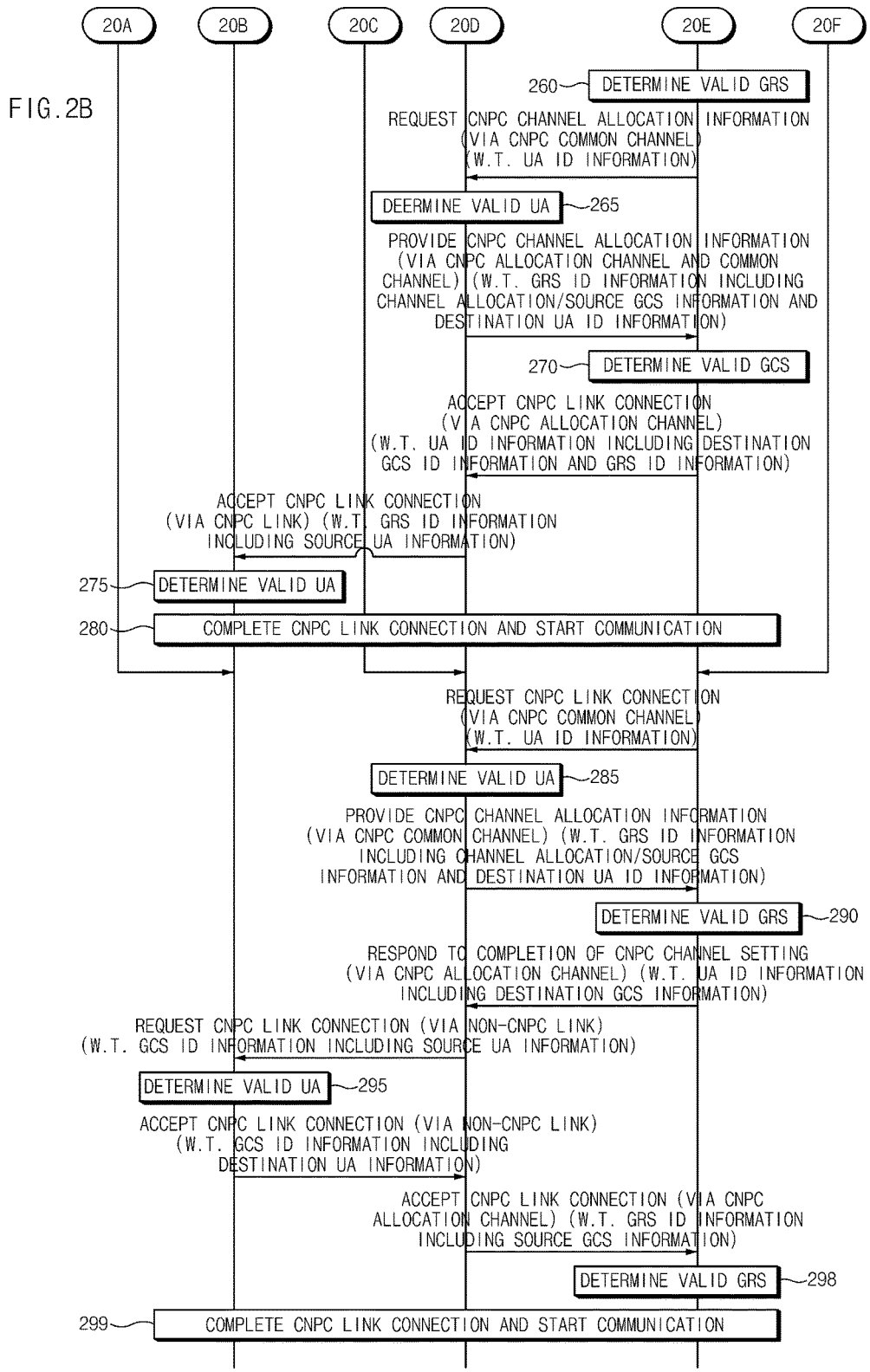

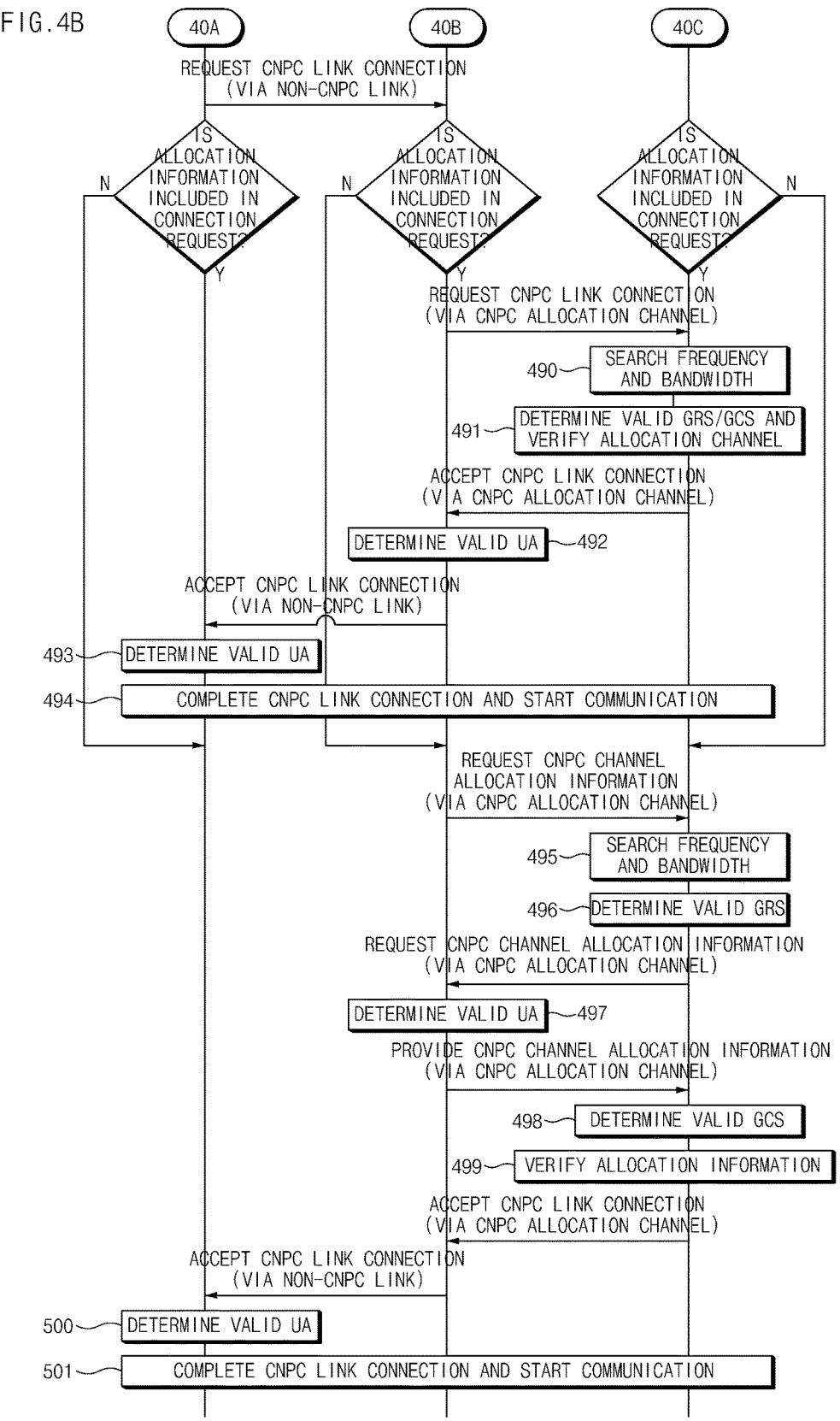

METHODS FOR INITIAL CHANNEL SETTING AND CONNECTION ESTABLISHMENT IN UNMANNED AIRCRAFT SYSTEMS (UAS) CONTROL AND NON-PAYLOAD COMMUNICATION (CNPC)

CROSS-REFERENCE TO RELATED APPLICATIONS

This application claims priority to and the benefit of Korean Patent Application No. 10-2016-0010025 filed in the Korean Intellectual Property Office on Jan. 27, 2016, the entire contents of which are incorporated herein by reference.

TECHNICAL FIELD

The present invention relates to unmanned aircraft systems (UAS), and particularly, to methods for initial channel setting and connection establishment in UAS terrestrial control and non-payload communication (CNPC).

BACKGROUND ART

Since a UA controlling communication channel in the related art is fixedly allocated by targeting point-to-point (P2P) type CNPC systems in the related art for a long time (in general, 1 year or more), when communication is established once initially in the P2P type CNPC system in the related art, the communication establishment is not changed, and as a result, it is difficult to support a dynamic channel allocation scheme.

In the case of an upward time division multiple access (TDMA)/downward frequency division multiple access (FDMA) based point-to-multipoint (P2MP) type system, since one ground radio station (GRS) forms a CNPC link with multiple UAs at the same uplink frequency, it is difficult to apply a communication channel and CNPC connection setting scheme in the P2P type CNPC system in the related art as it is.

SUMMARY OF THE INVENTION

The present invention has been made in an effort to provide a method for communication channel setting and connection establishment in a new UAS CNPC system which can dynamically allocate a UA controlling communication frequency resource to a channel to efficiently operate multiple UAs in a limited UAS control dedicated frequency band in a national airspace and be applied even to a next-generation P2MP type CNPC system, in order to stably operate the UAS and extend the demand of the UAS. That is, the present invention has been made in an effort to provide a method for setting a UAS controlling communication channel between a ground radio station (GRS) and an unmanned aircraft (UA), which is used for supporting dynamic allocation and management of a UAS controlling communication channel and a procedure for establishing connection of a UAS controlling communication channel among a ground control system (GCS), the ground radio station (GRS), and the unmanned aircraft (UA).

The technical objects of the present invention are not limited to the aforementioned technical objects, and other technical objects, which are not mentioned above, will be apparently appreciated to a person having ordinary skill in the art from the following description.

An exemplary embodiment of the present invention provides a method for communication channel setting and connection establishment in an unmanned aircraft system including a spectrum authority (SA) system, a ground control system (GCS), a ground radio station (GRS), and an unmanned aircraft (UA), including: supporting, by the SA system, dynamic channel allocation and management in a database for efficiently allocating and managing a limited frequency resource for controlling the unmanned aircraft; and initially setting and establishing communication connection of a control non-payload communication channel allocated according to the dynamic channel allocation among the GCS, the GRS, and the UA, wherein a point-to-point (P2P) type in which the GCS directly communicates with the UA or a point-to-multipoint (P2MP) type in which the GCS communicates with the UA through a plurality of GRSs interlocked on a network is supported.

In the initially setting and the establishing of the communication connection, a CNPC channel of the GRS may be set by the GCS and the CNPC channel of the UA may be set by the GCS or a pilot or an operation manager receives information from the GCS through a terminal and directly inputs the corresponding information in the UA to the CNPC channel.

The initially setting and the establishing of the communication connection may include requesting, by the GCS, an access to the GRS, determining, by the GRS, whether the GCS is valid to respond to an access acceptance to the valid GCS, determining, by the GCS, whether the GRS is valid to request CNPC channel setting to the valid GRS, setting, by the GRS, the CNPC channel and transmitting a setting completion message to the GCS, requesting, by the GCS or a terminal of a pilot or an operation manager, an access to the UA, determining, by the UA, whether the GCS or the terminal of the pilot or the operation manager is valid and responding to the access acceptance to the corresponding device when the GCS or the terminal of the pilot or the operation manager is valid, determining, by the corresponding device, whether the UA is valid to request the CNPC channel setting to the valid UA, setting, by the UA, the CNPC channel and transmitting the setting completion message to the corresponding device, requesting, by the GCS, CNPC communication link connection to the GRS, requesting, by the GRS, the communication link connection to the UA through the allocated CNPC channel, determining, by the UA, whether the GCS and the GRS requesting the link connection are valid to accept the connection to the valid GRS through the allocated CNPC channel, and accepting, by the GRS verifying the connection acceptance, the connection to the GCS.

The initially setting and the establishing of the communication connection may further include requesting, by the UA, the CNPC communication link connection to the GRS through the allocated CNPC channel, requesting, by the GRS, the communication link connection to the GCS, determining, by the GCS, whether the GCS and the UA requesting the link connection are valid to accept the connection to the valid GRS, and accepting, by the GRS verifying the connection acceptance, the connection to the UA through the allocated CNPC channel.

For any one of the GRS, the UA, and the GCS, or the terminal of the pilot or the operation manager to communicate with the other one among remaining components, a transmission message may include identification information thereof so as to be a basis for determining whether any one is valid and the transmissions message includes identification information of the other one so as for only the other one which is a counter entity to verify related information.

When the GCS or the terminal of the pilot or operation manager requests the CNPC channel setting to the valid UA, the transmission message may include allocation channel information, GRS ID information, and destination UA ID information, when the GCS requests the CNPC communication link connection to the GRS, the transmission message may include the destination UA ID information, when the GRS requests the communication link connection to the UA through the allocated CNPC channel, the transmission message may include the source GCS ID information, when the UA accepts the connection to the valid GRS through the allocated CNPC channel, the transmission message may include the destination GCS ID information, when the GRS accepts the connection to the GCS, the transmission message may include the source UA ID information, when the UA requests the allocated CNPC communication link connection to the GRS, the transmission message may include the destination GCS ID information, when the GRS requests the communication link connection to the GCS, the transmission message may include the source UA ID information, when the GCS accepts the allocated connection to the valid GRS, the transmission message may include the destination UA ID information, or when the GRS accepts the connection to the UA through the allocated CNPC channel, the transmission message may include the source GCS ID information.

In the initially setting and the establishing of the communication connection, the CNPC channel of the GRS may be set by the GCS, and the CNPC channel setting between the UA and the GRS may be attempted through a common channel or the allocated CNPC channel by the GRS which receives a request for the communication channel setting and connection establishment of the GCS or attempted by the GRS which receives a request for the communication channel setting and connection establishment of the UA through a common channel.

The initially setting and the establishing of the communication connection may include requesting, by the GCS, the access to the GRS, determining, by the GRS, whether the GCS is valid to respond to the access acceptance to the valid GCS, determining, by the GCS, whether the GRS is valid to request the CNPC channel setting to the valid GRS, setting, by the GRS, the CNPC channel and transmitting the setting completion message to the GCS, requesting, by the GCS, the CNPC communication link connection to the GRS, providing, by the GRS, channel allocation information and source GCS ID information to the UA through the allocated CNPC channel or the common channel and requesting the communication link connection, determining, by the UA, whether the GRS and the GCS are valid to accept the communication link connection to the valid GRS, and determining, by the GRS, whether the UA which accepts the connection is valid and accepting the communication link connection to the GCS.

The initially setting and the establishing of the communication connection may include requesting, by the GCS, the access to the GRS, determining, by the GRS, whether the GCS is valid to respond to the access acceptance to the valid GCS, determining, by the GCS, whether the GRS is valid to request the CNPC channel setting to the valid GRS, setting, by the GRS, the CNPC channel and transmitting the setting completion message to the GCS, requesting, by the GCS, the CNPC communication link connection to the GRS, requesting, by the GRS, the communication link connection to the UA without providing the CNPC channel allocation information, determining, by the UA, whether the GRS is valid to request the CNPC channel allocation information to the valid GRS, determining, by the GRS, whether the UA requesting the CNPC channel allocation information is valid to provide the CNPC channel allocation information and the source GCS ID information to the valid UA, determining, by the UA, whether the GCS is valid to accept the communication link connection to the GRS, and accepting, by the GRS, the communication link connection to the GCS.

The initially setting and the establishing of the communication connection may include requesting, by the GCS, the access to the GRS, determining, by the GRS, whether the GCS is valid to respond to the access acceptance to the valid GCS, determining, by the GCS, whether the GRS is valid to request the CNPC channel setting to the valid GRS, setting, by the GRS, the CNPC channel and transmitting the setting completion message to the GCS, requesting, by the UA, the CNPC communication link connection to the GRS through the common channel, determining, by the GRS, whether the UA is valid to provide the CNPC channel allocation information to the valid UA through the common channel, determining, by the UA, whether the GRS is valid to respond to channel setting completion to the valid GRS through the common channel or the allocation channel, requesting, by the GRS, the CNPC communication link connection to the GCS, determining, by the GCS, whether the UA is valid to accept the link connection to the GRS, and accepting, by the GRS, the link connection to the UA through the allocated CNPC channel.

For any one of the GRS, the UA, and the GCS, or the terminal of the pilot or the operation manager to communicate with the other one among remaining components, a transmission message may include identification information thereof so as to be a basis for determining whether any one is valid and the transmissions message may include identification information of the other one so as for only the other one which is a counter entity to verify related information.

When the GCS requests the CNPC channel setting to the GRS, the transmission message may include the allocation channel information and the destination UA ID information, when the GCS requests the CNPC communication link connection to the GRS, the transmission message may include the destination UA ID information, when the GRS requests the CNPC communication link connection to the UA, the transmission message may include the channel allocation information, the source GCS ID information, and the destination UA ID information, when the UA accepts the connection to the GRS, the transmission message may include the destination GCS ID information, when the GRS accepts the connection to the GCS, the transmission message may include the source UA ID information, when the UA requests the link connection to the GRS, the transmission message may include the destination GCS ID information, when the GRS requests the communication link connection to the GCS, the transmission message may include the source UA ID information, when the GCS accepts the connection to the GRS, the transmission message may include the destination UA ID information, or when the GRS accepts the connection to the UA, the transmission message may include the source GCS ID information.

Two or more common uplink and downlink frequency channels may be designated and managed by the SA in order to avoid interference among the GRSs which are simultaneously initially set, a common time slot may be designated at an uplink frequency of multiple UA supporting GRSs, or a common time slot may be designated at an uplink frequency of multiple UA supporting GRSs and two or more common downlink frequency channels may be designated and managed by the SA system in order to avoid the interference among the GRSs which are simultaneously initially.

An initial setting common channel may be set with a minimum bandwidth among channel bandwidths which are applicable at a center frequency of the allocated CNPC channel regardless of the size of the bandwidth of the allocated CNPC channel, or an initial setting common channel may be set with not the number of time slots allocated at an uplink frequency of the multiple UA supporting GRSs but the minimum number of slots among the number of applicable channel slots.

In the initially setting and the establishing of the communication connection, a search range may be reduced through energy detection and it may be verified whether the channel is present with respect to an allocatable bandwidth, the bandwidth and the time slot position, or the bandwidth and the time slot number and the time slot position for each center frequency allocatable within the reduced search range, and as a result, the UA does not receive uplink channel allocation information through the GRS or GCS, but directly searches the frequency, the bandwidth, the time slot number, or the time slot position through an uplink signal of the GRS.

The initially setting and the establishing of the communication connection may include verifying, by the UA, a channel list allocatable at a present position by referring to the database to set a search candidate band when possessing a GPS and a channel allocation database, performing the energy detection in a full band or the search candidate band, selecting the center frequency allocatable through the energy detection, verifying whether the channel is present for each uplink frequency bandwidth allocatable between the GRS and the UA at the allocatable center frequency, and verifying downlink channel information by verifying whether information of the UA itself is present in the verified channel.

The performing of the energy detection may include designating an initial energy detection frequency window, performing FFT for each designated frequency window, performing the energy detection for each designated frequency window, and verifying a frequency window in which an energy sum with an adjacent frequency window is more than a threshold value, and the selecting of the center frequency may include sequentially selecting frequency windows in an order in which the energy sum is the larger, and reducing the search range to ranges of the selected frequency window and the adjacent frequency window.

The method may include: after the reducing of the search range, setting a frequency window considering an allocatable maximum bandwidth; selecting a window position having a maximum energy value within the search range; searching whether the frequency channel is present for each allocatable center frequency in the vicinity of the selected window position; determining whether the maximum energy value is more than the threshold value and thereafter, sequentially setting, when the maximum energy value is not more than the threshold value, the windows sequentially considering the corresponding bandwidth in the order in which the allocatable bandwidth is the larger, and selecting the window position having the maximum energy value within the corresponding search range; verifying whether the channel is present for each uplink frequency bandwidth allocatable between the GRS and the UA for each allocatable center frequency; and verifying the downlink channel information by verifying whether the information of the UA itself is present in the verified channel.

The initially setting and the establishing of the communication connection may further include verifying whether there is the information of the UA itself in the verified channel according to the presence of the channel, sequentially setting, when the information of the UA itself is not included, the windows considering the corresponding bandwidth in the order in which the allocable bandwidth is the larger, and selecting the window position having the maximum energy value within the corresponding search range, reverifying whether the channel is present for each uplink frequency bandwidth allocatable between the GRS and the UA for each allocatable center frequency, and verifying the downlink channel information by verifying whether the information of the UA itself is present in the verified channel.

The initially setting and the establishing of the communication connection may further include verifying whether a channel having the maximum number of allocatable slots is present in the verifying of the presence of the channel and verifying whether there is the information of the UA itself in the verified channel, reverifying whether the uplink channel allocatable between the GRS and the UA is present sequentially in the order in which the number of allocatable slots is the larger when the information of the UA itself is not included, and verifying the downlink channel information by verifying whether the information of the UA itself is present in the verified channel.

According to exemplary embodiments of the present invention, a method for communication channel setting and connection establishment in unmanned aircraft systems (UAS) dynamically supports CNPC channel setting between a ground radio station (GRS) and an unmanned aircraft (UA) and CNPC link connection among a ground control system (GCS), the ground radio station (GRS), and the unmanned aircraft (UA), and as a result, a spectrum authority (SA) can manage all frequencies without fixedly allocating all of the frequencies to a specific CNPC system in real time and dynamically allocates all of the frequencies only when operating a UAS CNPC system and immediately recovers after completing the operation of the UAS CNPC system to allow another UAS CNPC system to reuse the frequencies, thereby increasing limited CNPC frequency utilization.

The present invention can be applied even in a next-generation upward TDMA or downward FDMA based P2MP type UAS controlling communication system including multiple UAS supporting GRSs as well as a P2P type in the related art.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIG. 2B is a continued flowchart of FIG. 2A.

FIG. 4B is a continued flowchart of FIG. 4A.

Figure 1A:
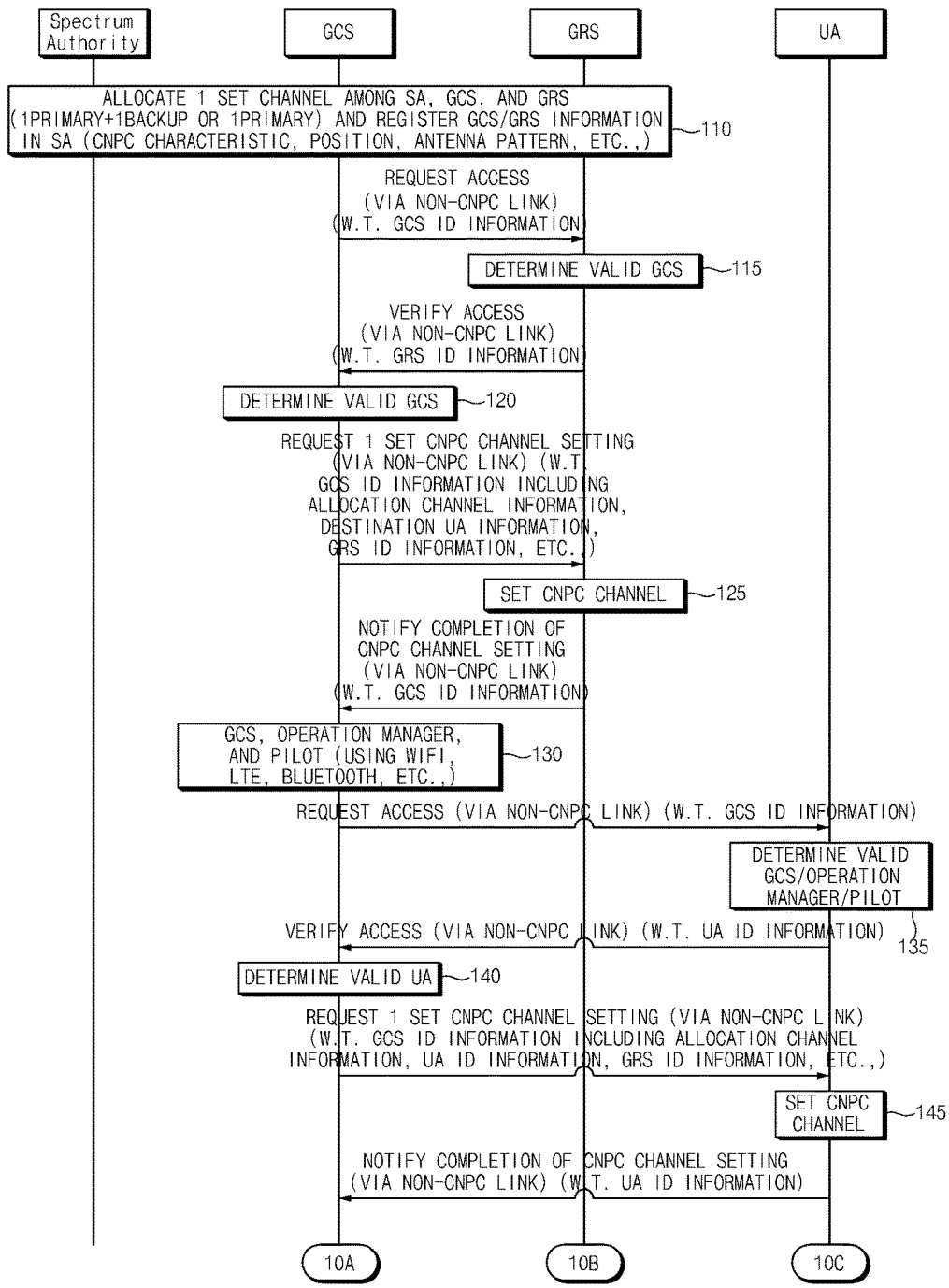
FIG. 1A is a flowchart for describing a method for CNPC manual channel setting and manual connection establishment in a UAS according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

All components required for all flight processes, which include a control communication system such as take-off/cruising, flight control, landing/recovery, and the like in addition to an unmanned aircraft (alternatively, a mounted radio station) which is a standalone communication system are collectively referred to as an unmanned aircraft system (hereinafter, referred to as UAS) or a remotely piloted aircraft system (hereinafter, referred to as RPAS).

The UAS is constituted by unmanned aircraft ground control equipment, an unmanned aircraft, and a data link and the data link is a wireless data link between a ground radio station and the unmanned aircraft and a UAS data link may be generally divided into a UAS ground control and non-payload communication (hereinafter, referred to as CNPC) link and a UAS payload link.

The payload data link as a link for transmitting data associated with payload execution generally has a wider band than a CNPC data link. On the contrary, the CNPC link as a link for transferring data associated with unmanned aircraft flight control, UAS state monitoring, and CNPC link management is constituted by a pilot/ATC relay link and a UAS control link. The pilot/ATC relay link is a communication link for relaying voice and data between an air traffic control (hereinafter, referred to as ATC) center and a pilot through the unmanned aircraft and the UAS control link is a link for transferring safety cruising associated control information between the pilot and an unmanned aircraft. The UAS control link may be redivided into a telecommand (hereinafter, TC) link and a telemetry (hereinafter, referred to as TM) link, and the TC link is an uplink for transferring flight trajectory control information, and all UAS control information required for safety flight, and the like from the pilot on the groundto the unmanned aircraft and the TM link is a downlink for transferring a position/altitude/speed of the unmanned aircraft, an operation mode and an operation state of the UAS, navigation assisted data, detection and avoidance associated tracking/weather radar/image information from the unmanned aircraft to the pilot on the ground.

As a frequency for an unmanned ground CNPC link, a C (5030 to 5091 MHz) band distributed to a new dedicated band is primarily considered in WRC-12 and besides, an aviation movement business distributed band such as an L (960 to 1164 MHz) band in which a reference is provided so as to be used as an aviation movement business in the WRC-12 may be considered. The C band is advantageous in that a frequency jamming influence with the system in the related art and multi-path delay spread are small, while it is disadvantageous in that using a directional antenna needs to be considered in order to secure a link margin and a Doppler influence is five times larger than that of the L band. Contrary to this, a low-frequency band distributed to other aviation movement business, such as the L band has a better propagation characteristic than the C band (the L band has lower propagation loss than the C band by 14 dB), but existing aviation systems including distance measurement equipment (DME), automatic dependent surveillance—broadcast (ADS-B), a tactic air navigation system (TACAN), and the like are crowdedly operated, and as a result, it is difficult to secure the frequency and the multi-path delay spread is large. Therefore, in general, a presecured C band is considered as a base link of the ground CNPC and a low-frequency band (L or UHF band) is anticipated to be used for increasing CNPC link availability for safe flight of the unmanned aircraft. Of course, the C band and the L band may be used reversely thereto.

Next, a ground CNPC link connection type includes a point-to-point (P2P) type and a network based point-to-multipoint (P2MP) type. The P2P type as a concept in which one ground control station (hereinafter, referred to as GCS) directly forms a data communication link with the unmanned aircraft (UA) (alternatively, a standalone communication system) is a type primarily considered in the existing unmanned aviation system. A channel for the CNPC needs to be allocated in order to operate the UAS CNPC system and in the existing P2P type CNPC system, however, a spectrum authority (hereinafter, referred to as SA) (system) is fixedly allocated with the channel at the time of registering the UAS CNPC system for a long time (in general, 1 year or longer). As a result, in the existing P2P CNPC system, when communication configuration is performed once at an initial stage, the communication configuration need not be changed.

On the contrary, a network based P2MP type is a type in which ground radio stations (hereinafter, referred to as GRS) are connected to interlock with each other on a network and each GCS exchanges information with the unmanned aircraft through a ground network and the GRS. For application and extension of public and private aircrafts, the P2MP type which may form a communication link together with multiple aircrafts and a nationwide network needs to be considered as a next-generation CNPC link and a related technology regarding the P2MP type UAS CNPC system has not yet been complete.

Therefore, a communication technology for efficiently using unmanned controlling communication frequency resources which may be all applied in the existing CNPC system and a next-generation CNPC system supporting the multiple unmanned aircrafts so as to efficiently operate the multiple unmanned aircrafts in a limited unmanned aircraft control dedicated frequency band is required for stable operation of the unmanned aircraft and extension of the demand of the unmanned aircraft.

The present invention has been made in an effort to provide a method for communication channel setting and connection establishment in a new UAS CNPC system, which may dynamically allocate to a channel an unmanned aircraft controlling communication frequency resource which may efficiently operate the multiple aircrafts in the limited unmanned aircraft control dedicated frequency band in a national airspace and be applied even to a next-generation upward TDMA/downward FDMA based P2MP type CNPC system including multiple unmanned aircraft supporting GRSs as well as the existing P2P type, for the stable operation of the unmanned aircraft and the extension of the demand of the unmanned aircraft. That is, the present invention has been made in an effort to provide a method for setting a UA controlling communication channel between a ground radio station (GRS) and an unmanned aircraft (UA), which is used for supporting dynamic allocation and management of a UA controlling communication channel and a procedure for establishing connection of a UA controlling communication channel among a ground control system (GCS), the ground radio station (GRS), and the unmanned aircraft (UA).

To this end, dynamic channel allocation and management is required, which allows the spectrum authority (SA) to dynamically allocate the frequency only when operating the UAS CNPC system while managing all frequencies in real time without fixedly allocating a specific frequency to a specific CNPC system and recover the allocated frequency immediately after completing the operation to reuse the frequency in other UAS CNPC systems and in such an environment, the UAS CNPC system of the present invention may support the dynamic channel allocation and management.

In the method for communication channel setting and connection establishment in the unmanned aircraft system (UAS) of the present invention, the unmanned aircraft CNPC system is primarily described, but the method may be applied even to other systems having a similar operation concept to the unmanned CNPC system. Further, a proposal scheme is proposed by considering the dynamic channel allocation and management, but may be similarly applied to static channel allocation and management.

In the unmanned aircraft CNPC system of the present invention, initial channel setting for a CNPC channel (including the frequency, a channel bandwidth, and even a time slot in the case of the P2MP type) to be used between the ground radio station (GRS) and the unmanned aircraft (UA), which is dynamically allocated from the spectrum authority (SA) is required after the unmanned aircraft flies. As an initial setting process of the communication channel before the flight of the unmanned aircraft CNPC system, an autonomous setting scheme and a manual setting scheme may be considered.

First, CNPC manual channel setting of the ground radio station (GRS) and the unmanned aircraft (UA), which supports the dynamic channel allocation and management for efficiently using a limited unmanned aircraft controlling spectrum and a method and a procedure of CNPC manual connection establishment among the ground control system (GCS), the ground radio station (GRS), and the unmanned aircraft (UA) are described. The manual setting scheme is a scheme in which a pilot directly sets radio resource information to be used in the unmanned aircraft (UA) in the unmanned aircraft (UA). The channel setting of the ground radio station (GRS) is performed through the ground control system (GCS) and as the channel setting of the unmanned aircraft (UA), various schemes including a scheme that directly sets the channel through the ground control system (GCS) or a scheme in which the pilot or an operation manager receives information to be input into the unmanned aircraft (UA) from the ground control system (GCS) and directly sets the information in the unmanned aircraft (UA) may be considered. For example, a scheme that directly performs communication setting in the unmanned aircraft (UA) through a wireless network such as WiFi, Bluetooth, or existing LTE by using a CNPC setting program installed in a smart phone or a personal computer (PC) and a scheme that directly inputs the information through an input device mounted on the unmanned aircraft (UA) may also be considered. The manual setting scheme may be a scheme that may operate by a simple protocol because the pilot may directly input the information in the unmanned aircraft (UA) and verify the input information only by a simple acknowledgement (ACK). However, the pilot or operation manager who will manually perform the communication setting needs to stand by in the vicinity of the unmanned aircraft (UA).

Figure 1B:
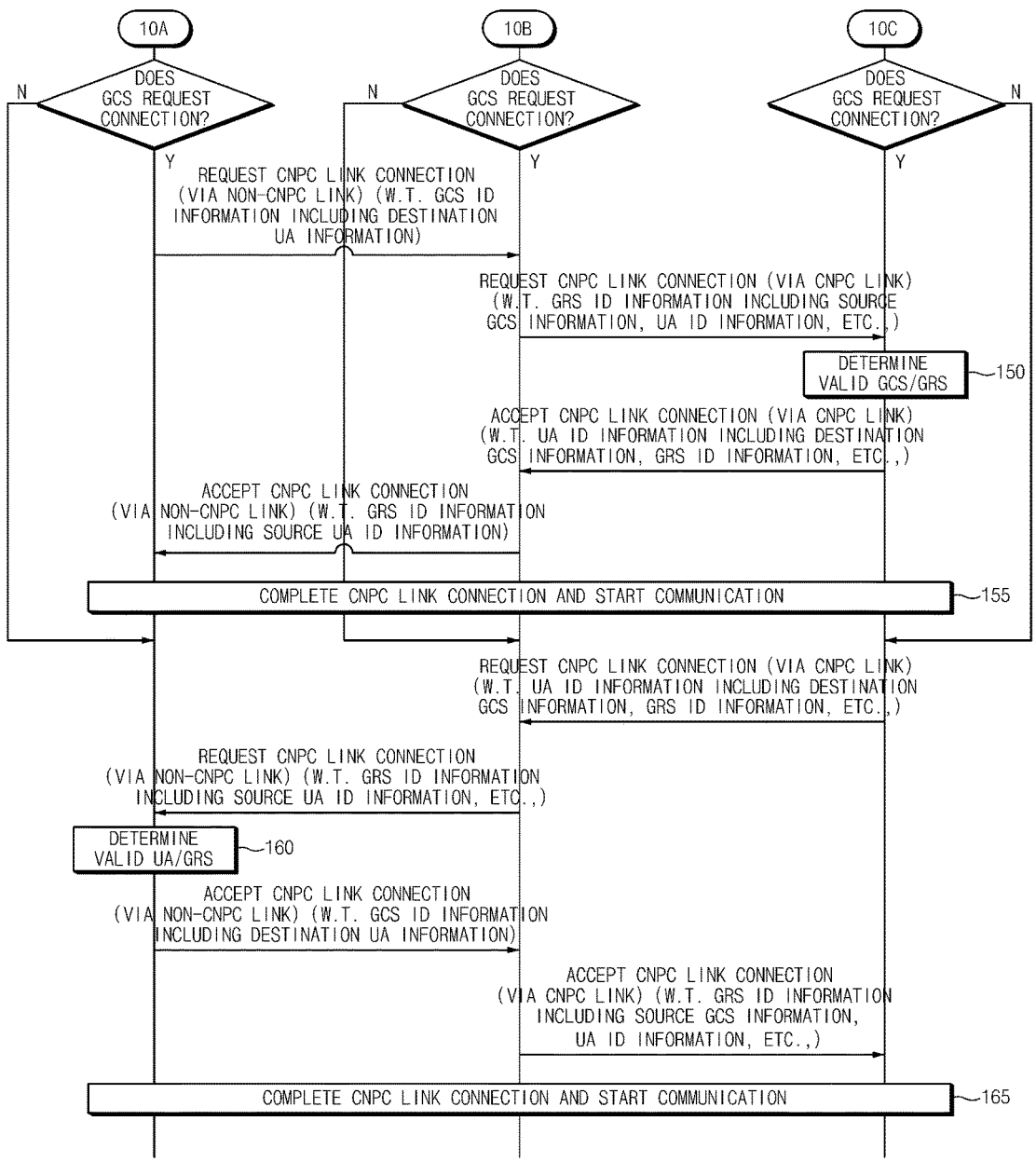
FIG. 1B is a continued flowchart of FIG. 1A.

FIG. 1A is a flowchart for describing a method for CNPC passive channel setting and passive connection establishment in a UAS according to an exemplary embodiment of the present invention. FIG. 1B is a continued flowchart of FIG. 1A. FIGS. 1A and 1B show a CNPC manual channel setting procedure of a ground radio station (GRS) and an unmanned aircraft (UA) before the unmanned aircraft (UA) takes off and a CNPC manual connection establishment procedure among a ground control system (GCS), the ground radio station (GRS), and the unmanned aircraft (UA).

A scenario may be considered, in which the ground control system (GCS) requests setting of a channel allocated from a spectrum authority (SA) to the ground radio station (GRS) and requests the channel setting to the unmanned aircraft (UA) after receiving a response to the setting.

The spectrum authority (SA) may allocate one set channel (one primary channel or one primary channel and one backup channel) to be used in the ground control system (GCS) and the ground radio station (GRS) and in this case, corresponding base information (a CNPC characteristic, an operation position, an antenna pattern, and the like) is registered and managed in the spectrum authority (SA) together with identification information of the ground control system (GCS) and the ground radio station (GRS) (110).

First, for the channel setting, the ground control system (GCS) makes an access request to the ground radio station (GRS) through non-CNPC links such as WiFi, LTE, Bluetooth, Ethernet, and the like together with information (GCS identification information) through which the ground radio station (GRS) may identify whether the GCS is valid. Herein, the GCS identification information may become a phone number, a medium access control (MAC) address, an identifier (ID), and the like. The ground radio station (GRS) determines whether the GCS which makes the access request is the valid GCS (115) and when the GCS is valid, the ground radio station (GRS) makes an access acceptance response together with the identification information (GRS identification information) thereof through the non-CNPC link. The ground control system (GCS) determines whether the GRS is valid based on the GRS identification information included in an acceptance response message of the GRS (120) and thereafter, when the GRS is valid, CNPC channel information allocated from the SA, destination unmanned aircraft identification information, and the like are transferred to the GRS through the non-CNPC link together with the GCS identification information/GRS identification information to request 1 set of CNPC channel setting. The ground radio station (GRS) sets a channel for a destination unmanned aircraft and a CNPC based on the transferred information (125) and thereafter, transfers a setting completion message to the GCS through the non-CNPC link.

A direct setting scheme is performed through the ground control system (GCS) or a pilot or an operation manager performs such a procedure even with respect to the unmanned aircraft (UA), and as a result, the UA also performs the channel setting for the CNPC with the GRS through the CNPC channel allocated to the GCS (130 to 145). That is, the access request is made to the unmanned aircraft (UA) through the non-CNPC links such as WiFi, LTE, Bluetooth, Ethernet, and the like together with information (GCS identification information) to identify whether the GCS is valid by using the ground control system (GCS) or a terminal of the pilot or the operation manager (130). The unmanned aircraft (UA) determines whether the GCS or the pilot or operation manager (terminal) which makes the access request is valid (135) and when the GCS or the pilot or operation manager (terminal) is valid, the UA makes the access acceptance response together with the identification information thereof (UA identification information) through the non-CNPC link. The ground control system (GCS) or the pilot or operation manager (terminal) determines whether the UA is valid based on the UA identification information included in the acceptance response message of the UA (140) and thereafter, when the UA is valid, the CNPC channel information allocated from the SA, GPS identification information and the like are transferred to the UA through the non-CNPC link together with the GCS identification information/UA identification information. The UA sets the channel for the destination unmanned aircraft and the CNPC based on the transferred information (145) and thereafter, transfers the setting completion message to the GCS through the non-CNPC link.

As described above, the GCS may access the GRS earlier, but the GCS accesses the UA earlier to complete the CNPC channel setting of the UA earlier and the GCS may perform the CNPC channel setting process of each of the GRS and the UA by simultaneously accessing the GRS and the UA.

As described above, when the CNPC channel setting is completed, the GCS, the GRS, and the UA need to be CNPC-connected. Since the GCS, the GRS, and the UA have already acquired the identification information among them during the CNPC channel setting process in advance, the GCS, the GRS, and the UA attempt the CNPC-connection by using the same. The GCS or UA may perform a CNPC connection request as illustrated in FIG. 1B.

First, for the CNPC connection, when the ground control system (GCS) attempts the connection request, the ground control system (GCS) transfers destination UA information together with the GCS identification information while making the CNPC connection request to the GRS through the non-CNPC link. The GRS transfers source GCS identification information together with the GRS identification information/UA identification information while making the connection request to a destination UA through the set CNPC channel link according to the connection request of the GCS. After the UA verifies whether the GCS and GRS which request the CNPC connection are valid based on the corresponding identification information (150), when the UA transfers a CNPC connection acceptance to the GRS (including the UA identification information, the GRS identification information, and the GCS identification information) and the GRS transfers the CNPC connection acceptance to the GCS (including the UA identification information and the GPS identification information), the CNPC connection among the GCS, the GRS, and the UA is completed and unmanned aircraft controlling communication may start (155).

Similarly, a case in which the UA attempts the CNPC connection request is progressed in a similar scheme to the case in which the GCS attempts the connection request as described above. That is, for the CNPC connection, when the UA attempts the connection request, the UA transfers destination GCS information together with the UA identification information while making the CNPC connection request to the GRS through the set CNPC channel link. The GRS transfers the UA identification information together with the GRS identification information/GCS identification information while making the connection request to the GCS through the non-CNPC link according to the connection request of the UA. After the GCS verifies whether the UA and the GRS which request the CNPC connection are valid based on the corresponding identification information (160), when the GCS transfers the CNPC connection acceptance to the GRS (including the UA identification information, the GRS identification information, and the GCS identification information) and the GRS transfers the CNPC connection acceptance to the UA (including the GCS identification information, the UA identification information, and the GRS identification information), the CNPC connection among the GCS, the GRS, and the UA is completed and the unmanned aircraft controlling communication may start (165).

The scheme of FIGS. 1A and 1B may be applied to both the P2P type and P2MP type CNPC systems. In FIGS. 1A and 1B, "w.t. ~identification information" is information required for verifying who transmits the connection request at a receiver side and its own GCS/GRS/UA identification information ("w.t. ~identification information") included together with the allocation channel and CNPC destination GCS/GRS/UA identification information ("w.t. ~identification information") is information included so as for only a receiver which knows the included identification information ("w.t. ~identification information") to verify transmission information. In general, the connection request may be performed in such a manner that allows a transmitter to encrypt and transmit the connection request based on the identification information ("w.t. ~identification information") and only a receiver which knows the identification information ("w.t. ~identification information") to decode the connection request. In the case where a security of a link among the GCS, GRS, and the UA has been already secured, the identification information ("w.t. ~identification information") may not be included.

Figure 2A:
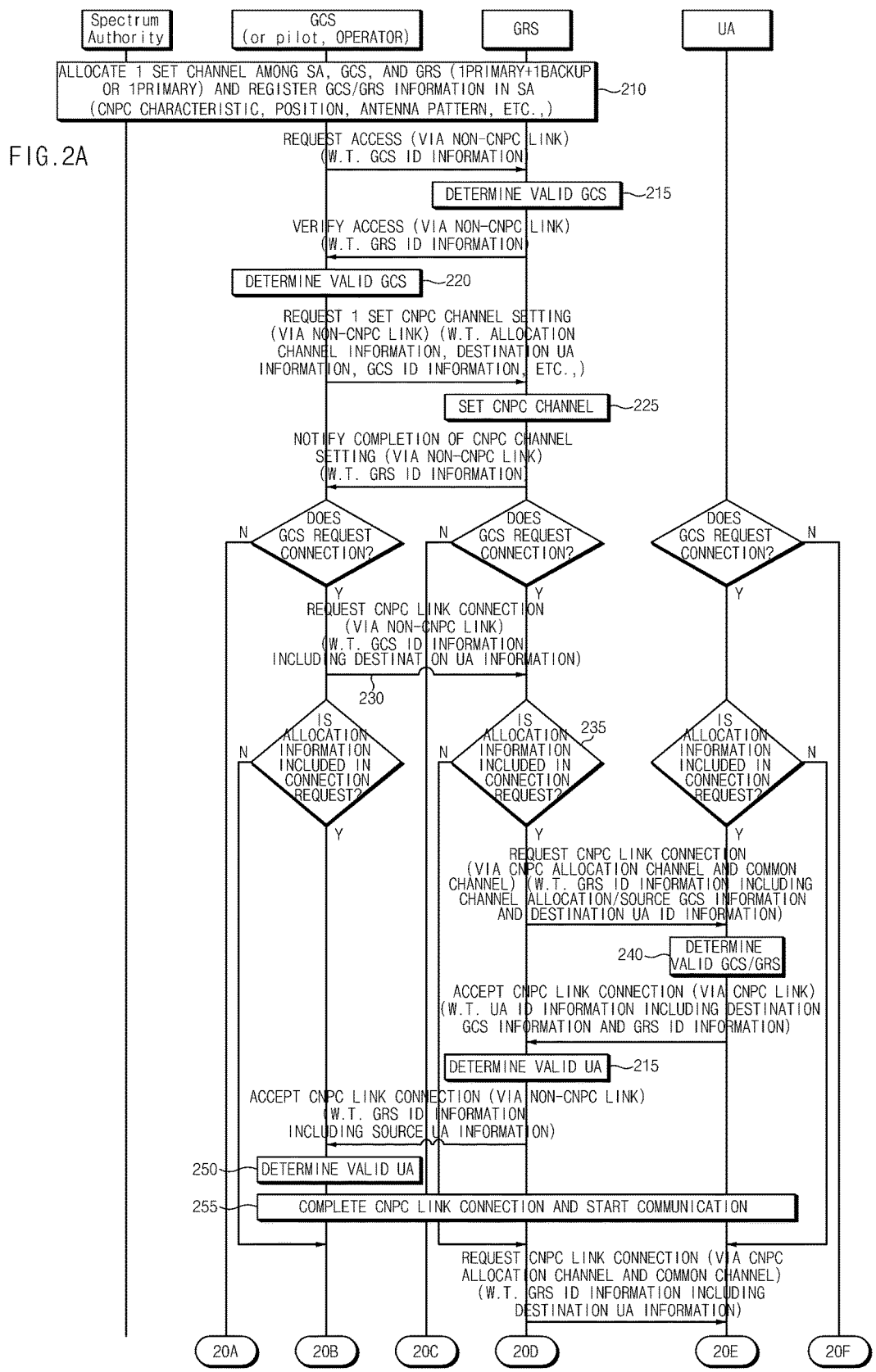
FIG. 2A is a flowchart for describing a method for CNPC automatic channel setting and automatic connection establishment in a UAS according to an exemplary embodiment of the present invention.

FIG. 2A is a flowchart for describing a method for CNPC automatic channel setting and automatic connection establishment in a UAS according to an exemplary embodiment of the present invention. FIG. 2B is a continued flowchart of FIG. 2A. FIGS. 2A and 2B show a CNPC autonomous channel setting procedure of a ground radio station (GRS) and an unmanned aircraft (UA) before the unmanned aircraft (UA) takes off and a CNPC autonomous connection establishment procedure among a ground control system (GCS), the ground radio station (GRS), and the unmanned aircraft (UA).

An autonomous setting scheme is a scheme that transfers to the UA the frequency band (channel) and the bandwidth allocated to the UA through the UA CNPC system. That is, during the channel and bandwidth setting process among the GRS and the UA, intervention by the pilot or operation manager is not required.

The spectrum authority (SA) may allocate one set channel (one primary channel or one primary channel and one backup channel) to be used in the ground control system (GCS) and the ground radio station (GRS) and in this case, corresponding base information (a CNPC characteristic, an operation position, an antenna pattern, and the like) is registered and managed in the spectrum authority (SA) together with identification information of the ground control system (GCS) and the ground radio station (GRS) (210).

First, for the autonomous channel setting, the ground control system (GCS) makes an access request to the ground radio station (GRS) through non-CNPC links such as WiFi, LTE, Bluetooth, Ethernet, and the like together with information (GCS identification information) through which the GRS may identify whether the GCS is valid similarly to the manual setting scheme. Herein, the GCS identification information may become a phone number, a medium access control (MAC) address, an identifier (ID), and the like. When the GCS which makes the access request is valid (215), the GRS makes the access acceptance response together with the identification information (GRS identification information) thereof through the non-CNPC link. The GCS determines whether the GRS is valid based on the GRS identification information included in the acceptance response message of the GRS (220) and thereafter, transfers the CNPC channel information and the destination UA identification information allocated from the SA to the GRS through the non-CNPC link together with the GCS identification information. The GRS sets the channel for the destination unmanned aircraft (UA) and a CNPC based on the transferred information (225) and thereafter, transfers the setting completion message to the GCS.

Next, the CNPC channel setting of the UA and the connection setting among the GCS, the GRS, and the UA are autonomously set through the CNPC link between the GRS and the UA unlike manual setting. In the CNPC connection setting between the GRS and the UA, the GRS may attempt the connection request earlier and the UA may attempt the connection request earlier.

For the CNPC channel setting and CNPC autonomous connection, when the ground control system (GCS) attempts the channel setting and connection request, the ground control system (GCS) transfers the destination UA information together with the GCS identification information while making the CNPC connection request to the GRS through the non-CNPC link (230).

When the GRS makes the connection request (including channel allocation information) to the UA (235), the GRS makes the connection request by transferring the CNPC channel information and the source GCS identification information allocated to the UA together with the GRS identification information/UA identification information to the destination UA. In this case, the connection request may be made through the CNPC allocation channel received from the GCS or a predetermined CNPC common channel which all GRSs and UAs may access is designated to make the connection request through the channel. As described below, when the received CNPC allocation channel is used, since the UA does not know uplink information of the received allocation channel, a process of searching an uplink channel is first required so as for the UA to receive related information. When the connection request is made while including the channel allocation and the source GCS information, only the corresponding UA needs to be allowed to verify the information.

After the UA verifies whether the GCS and the GRS which request the CNPC connection are valid based on the corresponding identification information (240), when the UA transfers the CNPC connection acceptance to the GRS (including the UA identification information, the GRS identification information, and the GCS identification information) and the GRS determines whether the corresponding UA is valid (245) and thereafter, transfers the CNPC connection acceptance to the GCS (including the UA identification information and the GRS identification information), the GCS determines whether the corresponding UA is valid (250) and thereafter, the CNPC connection among the GCS, the GRS, and the UA is completed and the unmanned aircraft controlling communication may start (255).

When the GRS does not include the channel allocation information at the time of making the connection request (235), it is verified whether the UA and the GRS first verifies whether the UA and the GRS are valid each other through the CNPC common channel (260 and 265).

Thereafter, the GRS provides the allocated CNPC channel information and source GCS identification information to the destination UA together with the GRS identification information/UA identification information. Herein, when the CNPC allocation frequency channel is used, the destination UA identification information and downlink allocation channel information used so as for the UA to request the allocation channel information to the GRS are also provided. Thereafter, after the UA verifies whether the GCS is valid with respect to the CNPC connection request based on the corresponding ID information (270), when the UA transfers the CNPC connection acceptance to the GRS (including the UA identification information, the GRS identification information, and the GCS identification information) and the GRS transfers the corresponding acceptance to the GCS (including the UA identification information and the GRS identification information), the GCS determines whether the corresponding UA is valid (275) and thereafter, the CNPC connection among the GCS, the GRS, and the UA is completed and the unmanned aircraft controlling communication may start (280).

On the contrary, when the UA attempts the CNPC channel setting and connection request to the GRS, since the UA may not know the allocated channel information, the UA uses a common channel which all GRSs and UAs may access. For the CNPC connection, when the UA attempts the connection request, the UA transfers the UA identification information. The GRS compares the identification information of the UA which makes the connection request and the identification information of the destination UA received from the GCS to determine whether the UA is valid (285) and thereafter, provides the channel allocation information and source GCS information to the corresponding UA through the uplink common frequency channel. In this case, a transmission message (signal) may include the destination UA identification information so as for only the corresponding UA to verify related information such as transferred information, and the like. The UA determines whether the GRS is valid (290) and thereafter, notifies the CNPC channel setting completion to the GRS through a downlink CNPC allocation channel (alternatively, the common channel) based on the received channel allocation information (including the UA ID information, the GRS ID information, and the GCS ID information). The GRS receives channel setting completion information from the UA and thereafter, makes the CNPC connection request to the GCS through the non-CNPC link similarly in the manual setting. After the GCS verifies whether the UA and the GRS which request the CNPC connection are valid based on the corresponding identification information (295), when the GCS transfers the CNPC connection acceptance to the GRS (including the UA identification information, the GRS identification information, and the GCS identification information) and the GRS transfers the CNPC connection acceptance to the UA (including the GCS identification information, the UA identification information, and the GPS identification information), the UA determines whether the GRS is valid (298) and thereafter, the CNPC connection among the GCS, the GRS, and the UA is completed and the unmanned aircraft controlling communication may start (299).

The scheme of FIGS. 2A and 2B may be applied to both the P2P type and P2MP type CNPC systems. In FIGS. 2A and 2B, "w.t. identification information" is information, which is required for verifying who transmits the identification information at a receiver side and the GCS/GRS/UA information ("w.t. identification information") included together with the allocation channel and CNPC destination GCS/GRS/UA information ("w.t. identification information") is information included in the transmission message (signal) so as for only a receiver which knows the corresponding identification information ("w.t. identification information") to verify transmission information. In general, the connection request may be performed in such a manner that allows a transmitter to encrypt and transmit the connection request based on the identification information and only a receiver which knows the identification information to decode the connection request. In the case where the security of the link among the GCS, GRS, and the UA entities has been already secured, the identification information ("w.t. identification information") may not be included.

In the scheme of FIGS. 2A and 2B, as a CNPC communication link which the GRS uses for initially autonomously setting the communication with the UA before take-off regardless the GCS before the UA takes off, a method using the CNPC common channel and a method using the CNPC allocation channel received from the GCS may be considered.

In the P2P type, as the CNPC common channel, a UA initially setting CNPC common frequency channel may be designated. In this case, in order to avoid common channel interference among the GRSs which are simultaneously and initially set, two or more common channels (uplink/downlink frequency channel) may be designated and managed by the SA. In the P2MP type, the CNPC common channel may designate a common time slot at a GRS uplink frequency for initially setting the UA and designate the common time slot at the GRS uplink frequency for initially setting the UA and a CNPC common downlink frequency channel. In this case, in order to avoid the common channel interference among the GRSs which are simultaneously and initially set, two or more common downlink frequency channels may be designated and managed by the SA. That is, in order to avoid the interference among the GRSs which are simultaneously and initially set, two or more common uplink and downlink frequency channels are designated or managed by the SA system, the common time slot is designated at the uplink frequency of the multiple UA supporting GRSs, or the common time slot is designated at the uplink frequency of the multiple UA supporting GRSs and simultaneously, two or more common downlink frequency channels may be designated and managed by the SA system in order to avoid the interference among the GRSs which are simultaneously and initially set.

On the contrary, when the CNPC allocation channel received from the GCS is used, a process of searching the allocation uplink/bandwidth/time slot (in the case of the P2MP) is required so as for the UA to verify the connection request of the GRS. When the CNPC allocation channel is used in the P2P type, the allocation frequency channel bandwidth may be used as it is and the minimum bandwidth may be used only in initial setting. When the allocation frequency channel bandwidth may be used as it is, frequency search and channel bandwidth search are required, while the frequency search is just performed when the minimum bandwidth is used only in the initial setting. When the CNPC allocation channel is used in the P2MP type, a method using the allocation time slot as it is and a method using the minimum time slot only while the initial setting may be considered. When the allocation time slot is used as it is, the frequency/channel bandwidth search and searching the number of allocation time slots and the positions thereof are required, while when the minimum time slot number is used, only the time slot position is just searched together with the frequency/channel bandwidth search. That is, the initial setting common channel may be set with the minimum bandwidth among channel bandwidths allocatable at the center frequency of the allocated CNPC channel regardless of the bandwidth size of the allocated CNPC channel or the initial setting common channel may be set with not the number of time slots allocated at the uplink frequency of the multiple UA supporting GRSs but the minimum slot number among the number of allocatable channel slots.

Figure 3A:
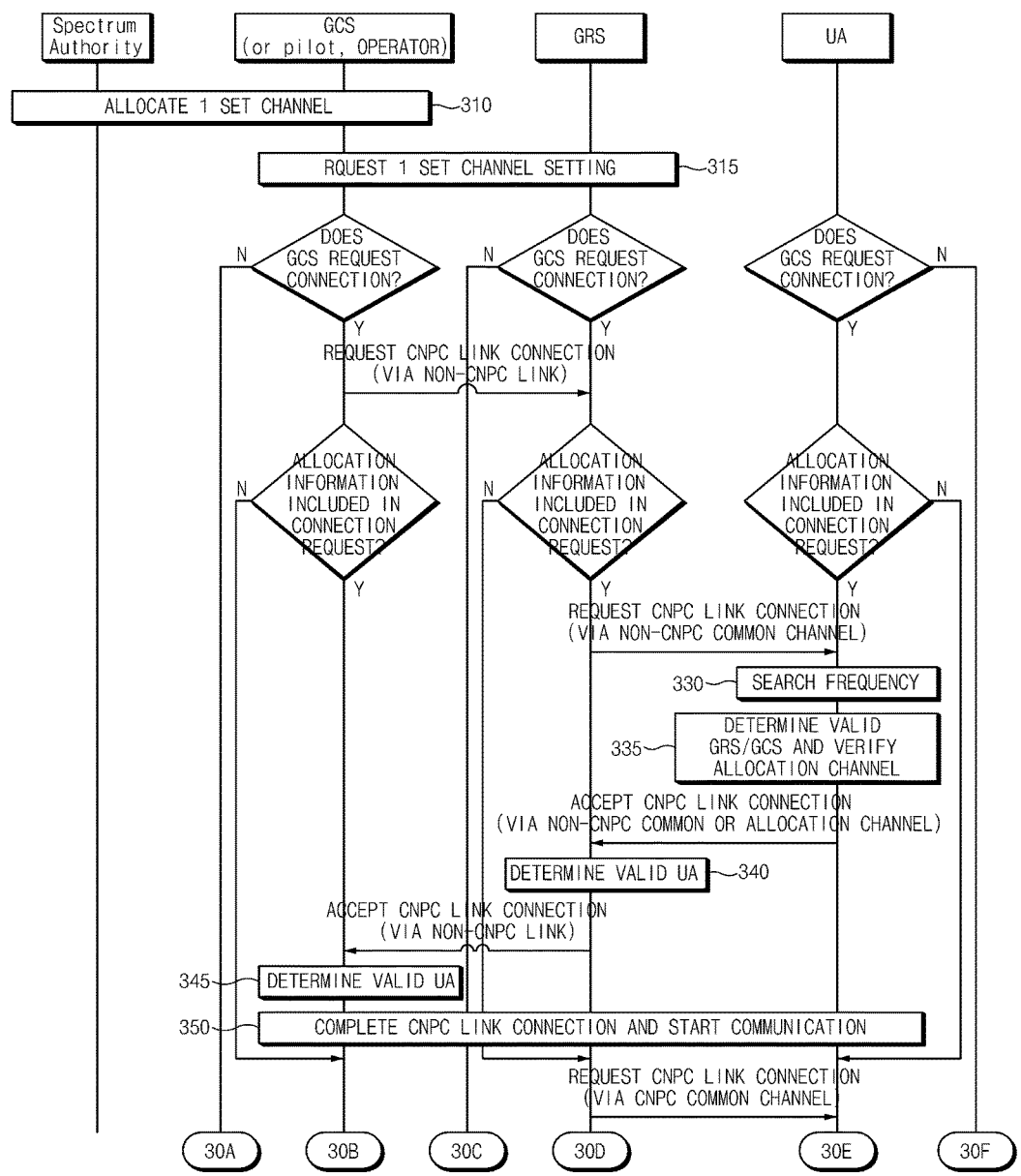
FIG. 3A is a flowchart for describing a P2P type automatic initial setting method in the case of using a common channel for initial CNPC channel setting in a UAS according to an exemplary embodiment of the present invention.
Figure 3B:
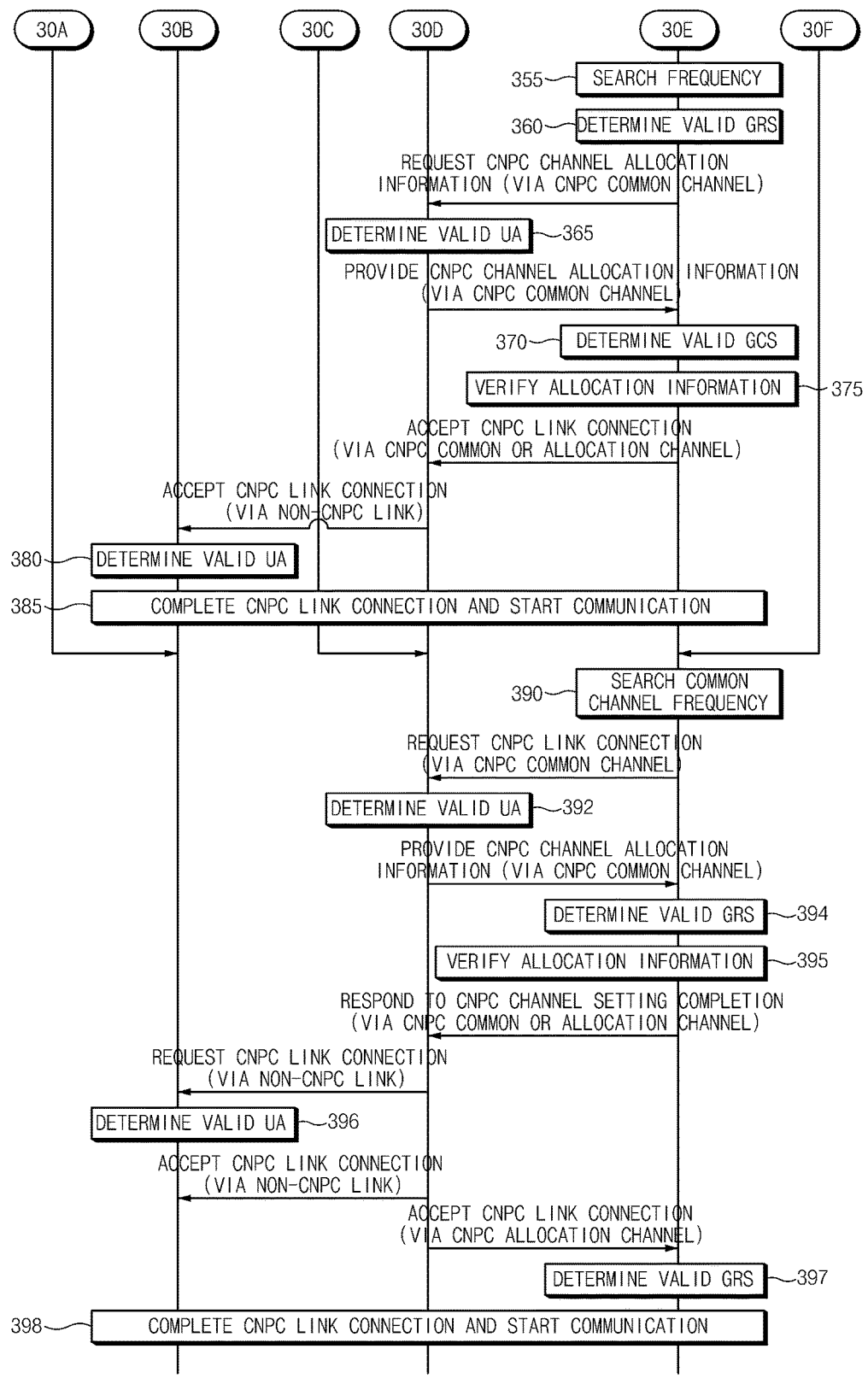
FIG. 3B is a continued flowchart of FIG. 3A.

FIG. 3A is a flowchart for describing a P2P type automatic initial setting method in the case of using a common channel for initial CNPC channel setting in a UAS according to an exemplary embodiment of the present invention. FIG. 3B is a continued flowchart of FIG. 3A.

In the case of the P2P type, for allocation of the common channel for the initial setting to the respective GRSs, the SA designates a specific common channel for each airspace volume based on a frequency reuse plane in an entire airspace and the GRS in the airspace volume performs initial setting with the UA by using a designated specific common channel. In this case, when a plurality of GRSs in the same airspace volume uses the same specific common channel in order to simultaneously attempt the initial setting, interference may occur, and as a result, two or more specific common channels are set per airspace volume to allow each GRS to randomly select the specific common channel, thereby avoiding the interference. As another method, the interference may be avoided by a scheme in which the SA allocates and recovers the common channels for each GRS which initially sets the common channels like channel allocation and management for the CNPC.

Information on the specific common channel which may be used in the airspace volume is included in a database (DB) of the SA, the GCS may verify the common channel information which may be used by accessing the SA (310), and designate even the common channel information to be used when the SA allocates the CNPC channel and notify the designated common channel information to the GRS through the GCS (315). When the GRS uses the specific common channel, the UA needs to search the specific common channel used by the GRS for initial setting of the CNPC link between the GRS and the UA. Since a fixed channel bandwidth is used as the specific common channel, the UA searches only the frequency for the specific common channel.

Processes of FIGS. 3A and 3B are similar to those of FIGS. 2A and 2B, however, in order for the UA to search the frequency for the specific common channel, processes including frequency search after the GRS requests the link connection when there is allocated channel information (330), frequency search after the GRS requests the link connection when there is no allocated channel information (355), verifying the allocation channel information after determining whether the GCS is valid (375), frequency search before the UA requests the CNPC link connection (390), verifying the allocation channel information after determining whether the GRS is valid (395), and the like are added. Herein, in mutual communication such as the request, the acceptance, and the like of the CNPC link connection in the UA/GRS, the common channel is used, however, after the allocation channel is set as the UA verifies the allocation channel information (375/395), the corresponding allocated CNPC channel is used as the common channel in UA-GRS communication.

In FIGS. 3A and 3B, remaining processes of 335, 340, 345, 350, etc., are similar to processes of 240, 245, 250, 255, etc., in FIGS. 2A and 2B.

Figure 4A:
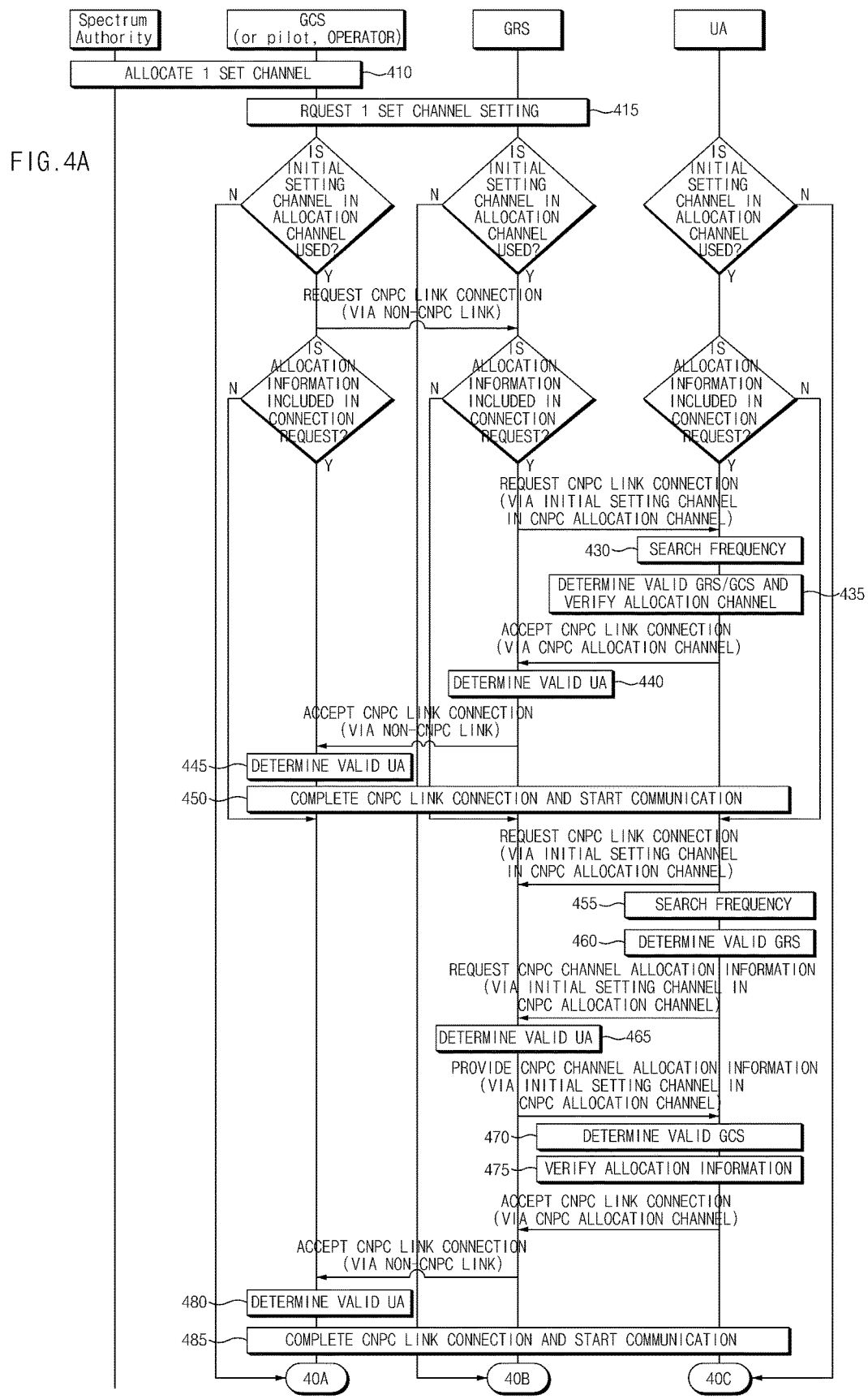
FIG. 4A is a flowchart for describing a P2P type automatic initial setting method in the case of using a CNPC channel allocated for initial CNPC channel setting in a UAS according to an exemplary embodiment of the present invention.

FIG. 4A is a flowchart for describing a P2P type automatic initial setting method in the case of using a CNPC channel allocated for initial CNPC channel setting in a UAS according to an exemplary embodiment of the present invention. FIG. 4B is a continued flowchart of FIG. 4A. FIG. 4A illustrates CNPC channel connection establishment for the connection request in the GRS in the case of using the initial setting channel among the CNPC channels and FIG. 4B illustrates CNPC channel connection establishment for the connection request in the GRS in the case of using the CNPC channel bandwidth.

The spectrum authority (SA) may allocate the CNPC channel (including the initial setting channel) to be used in the GCS and the GRS and manage the allocated CNPC channel in the database (DB), the GCS may verify the CNPC channel (including the initial setting channel) which may be used by accessing the SA (410), and the SA may notify the CNPC channel (including the initial setting channel) to the GRS through the GCS when allocating the CNPC channel (415).

The process of FIG. 4A and the process of FIG. 4B are similar to the CNPC channel connection establishment processes 310 to 385 for the connection request in the GRS during the process of FIG. 3A/3B, respectively.

However, when the initial setting channel of the CNPC channel of FIG. 4A is used, processes including frequency search after the GRS requests the link connection when there is allocated channel information (430), frequency search after the GRS requests the link connection when there is no allocated channel information (455), verifying the allocation channel information after determining whether the corresponding GCS is valid (475), and the like are added in order for the UA to search the frequency. Herein, in the mutual communication such as the request, the acceptance, and the like of the CNPC link connection in the UA/GRS, the initial setting channel is used, however, after the allocation channel is set as the UA verifies the allocation channel information (375), the corresponding allocated CNPC channel is used in the UA-GRS communication. In FIG. 4A, remaining processes of 435, 440, 445, 450, etc., are similar to the processes of 335, 340, 345, 350, etc., in FIG. 3A/3B.

When the bandwidth of the CNPC channel of FIG. 4B is used, processes including frequency search after the GRS requests the link connection when there is allocated channel information (490), frequency search after the GRS requests the link connection when there is no allocated channel information (495), verifying the allocation channel information after determining whether the GCS is valid (499), and the like are added in order for the UA to search the frequency. Herein, in the mutual communication such as the request, the acceptance, and the like of the CNPC link connection in the UA/GRS, the corresponding allocated CNPC channel is used. In FIG. 4B, remaining processes of 491, 492, 493, 494, etc., are similar to the processes of 335, 340, 345, 350, etc., in FIG. 3A/3B.

As such, in the case of performing initial setting by using the CNPS channel received between the GRS and the UA, the UA does not know the received channel information. Thus, when the allocation channel used by the GRS needs to be searched, in the case where many types of allocation channels are present, the GRS needs to research simultaneously the allocation frequency and the allocation bandwidth by considering the many types of allocation channels and thus the searching time may be increased. In order to reduce the searching time, in the initial setting, as illustrated in FIG. 4A, an initial setting channel having a bandwidth which is not larger than an allocable bandwidth other than the allocated bandwidth may be fixedly used. For example, in the case of RTCA MOPS Baseline Radio, in the uplink, three data classes are present and the data classes have channel bandwidths of 30/60/90 kHz, respectively. In this case, regardless of the size of the bandwidth that receives the initial setting channel, an initial setting channel of 30 kHz Data Class1 having a minimum bandwidth at a central frequency of the allocated CNPC channel may be created. Since the initial setting channel bandwidth is smaller than any allocated channel bandwidth and thus the effect of the interference considered when the SA allocates the channel is small, it is determined that there is no problem in utilization. In this case, the UA knows the channel bandwidth and thus searches only the frequency to reduce the searching time.

As illustrated in FIG. 4B, in the case of using the allocation channel bandwidth as it is, the UA needs to notify the downlink allocation channel capable of requesting the channel allocation information when the allocation information is not included at the time of making the connection request. In the case of using the CNPC allocation bandwidth, unlike the case of using the common channel, only when the UA acquires the downlink channel information through the uplink, the UA may know the downlink allocation channel and thus the UA may not first request the connection.

Meanwhile, the initial automatic setting process in the P2MP type is similar to the P2P type, but some differences are present as follows. First, in the case of the uplink common channel in the P2MP type initial automatic setting process using the common channel for the initial setting, the P2MP type GRS has already been allocated with the uplink frequency from the SA and communicates with other UAs through the allocated uplink frequency, and thus it is difficult to use another uplink common frequency. Accordingly, in the uplink common channel in the P2MP type, a specific slot in the uplink frequency used by the P2MP type GRS is used as the common channel. In the case of the downlink common channel, like the P2P type, the common frequency channel is assigned under the SA management.

On the other hand, in the case of the P2MP type automatic initial setting process using the allocated CNPC channel for the initial setting, the UA also needs to search locations and the number of allocation slots together with the searching of the allocation frequency and the allocation bandwidth. In the case of radio technical commission for aeronautics (RTCA) minimum operational performance standards (MOPS) baseline radio, 8 channel bandwidths are present, three allocable slots are present in each bandwidth, and a plurality of allocation slot positions are present according to the channel bandwidth, and thus it is expected that the searching time of the CNPC allocation channel will be increased compared with that of the P2P type. Accordingly, even in the P2MP type, in order to reduce the searching time, at the time of the initial setting, the initial setting channel having the number of slots which is not larger than the number of allocable slots other than the number of received time slots may be fixedly used. For example, in the case of the RTCA MOPS baseline radio, in the uplink, three data classes are present and the data classes have the time slot number of 1, 2, and 3, respectively. In this case, regardless of the time slot number that receives the initial setting channel, an initial setting channel of 1 slot data class 1 having a minimum number of slots may be created at a middle position among the allocated CNPC time slots. Since the number of initial setting time slots is smaller than the number of allocated time slots of any channel, the effect of interference considered when the SA allocates the slots is small and thus it is determined that there is no problem in utilization. In this case, the UA knows the time slot number and searches only a central frequency, a bandwidth, and a slot location to reduce the searching time. As a result, the initial automatic setting procedure of the P2MP type CNPC system represents the same procedure as a case of changing the frequency searching to the frequency/bandwidth searching in the initial automatic setting process of the P2P type CNPC system or changing the frequency and bandwidth searching to frequency/bandwidth/slot number/slot location or the searching of frequency/bandwidth/slot location searching. That is, by reducing the searching range through energy detection and verifying the presence of the channels with respect to the allocable bandwidth, the bandwidth and the time slot location, or the bandwidth, the time slot number, and the time slot location for each central frequency allocable in the reduced searching range, the UA may directly search the frequency, the bandwidth, the time slot number, and the time slot location through the uplink signal of the GRS without receiving the uplink channel allocation information through the GRS or the GCS.

As a method for reducing the searching time in the P2P type and the P2MP type, in the case where the UA may use the GPS information and has the CNPS frequency utilization DB in the national airspace, a candidate CNPC bandwidth list is selected at the UA location by using the CNPC frequency utilization DB to have the priority for the searching frequency band, thereby reducing the searching time. If not, the UA needs to blind-search the CNPC entire band.

Figure 5A:
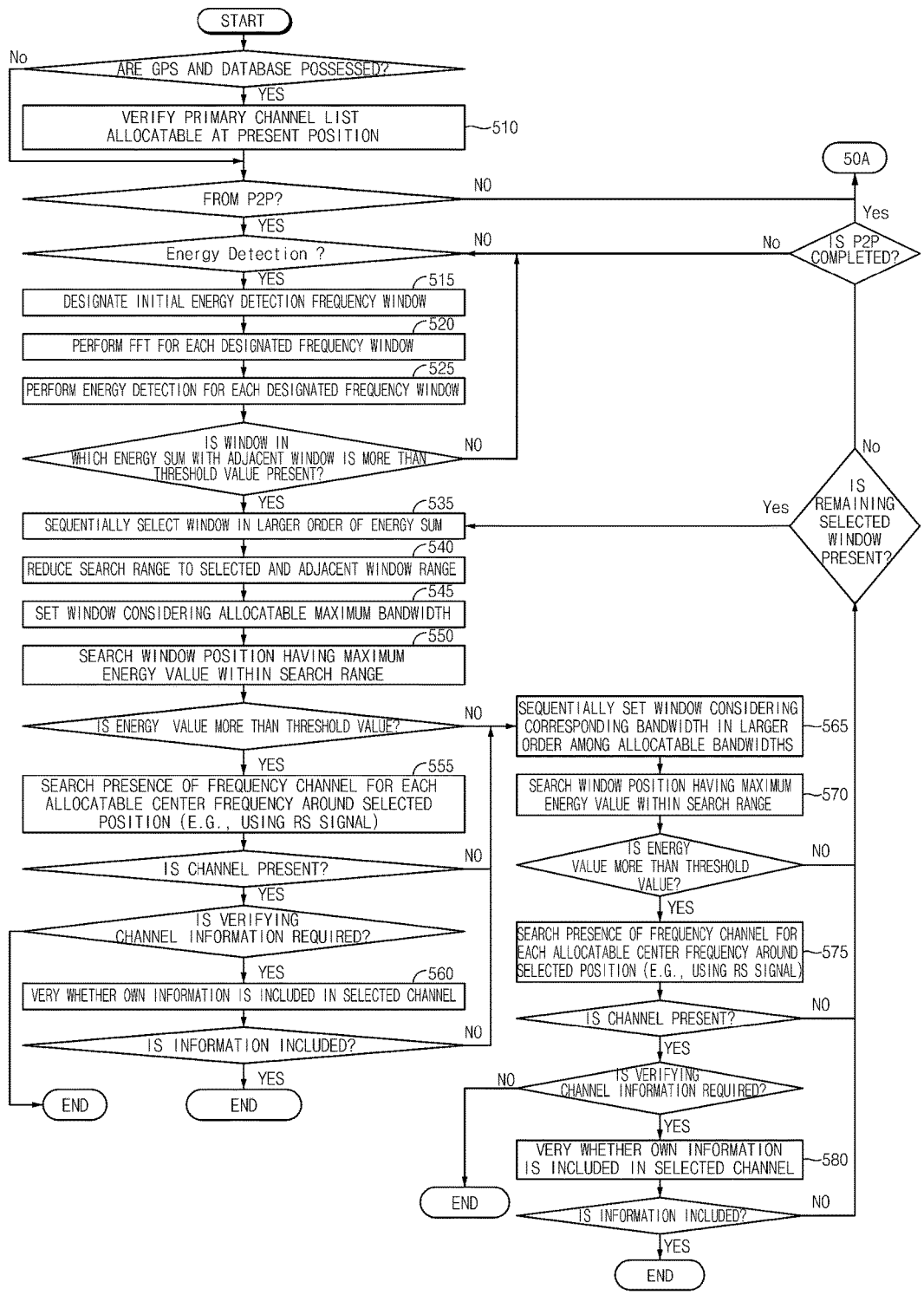
FIG. 5A is a flowchart for describing a process in which a UA searches an uplink frequency, a frequency bandwidth, and a time slot in an initial CNPC channel process (P2P type and P2MP type) in a UAS according to an exemplary embodiment of the present invention.
Figure 5B:
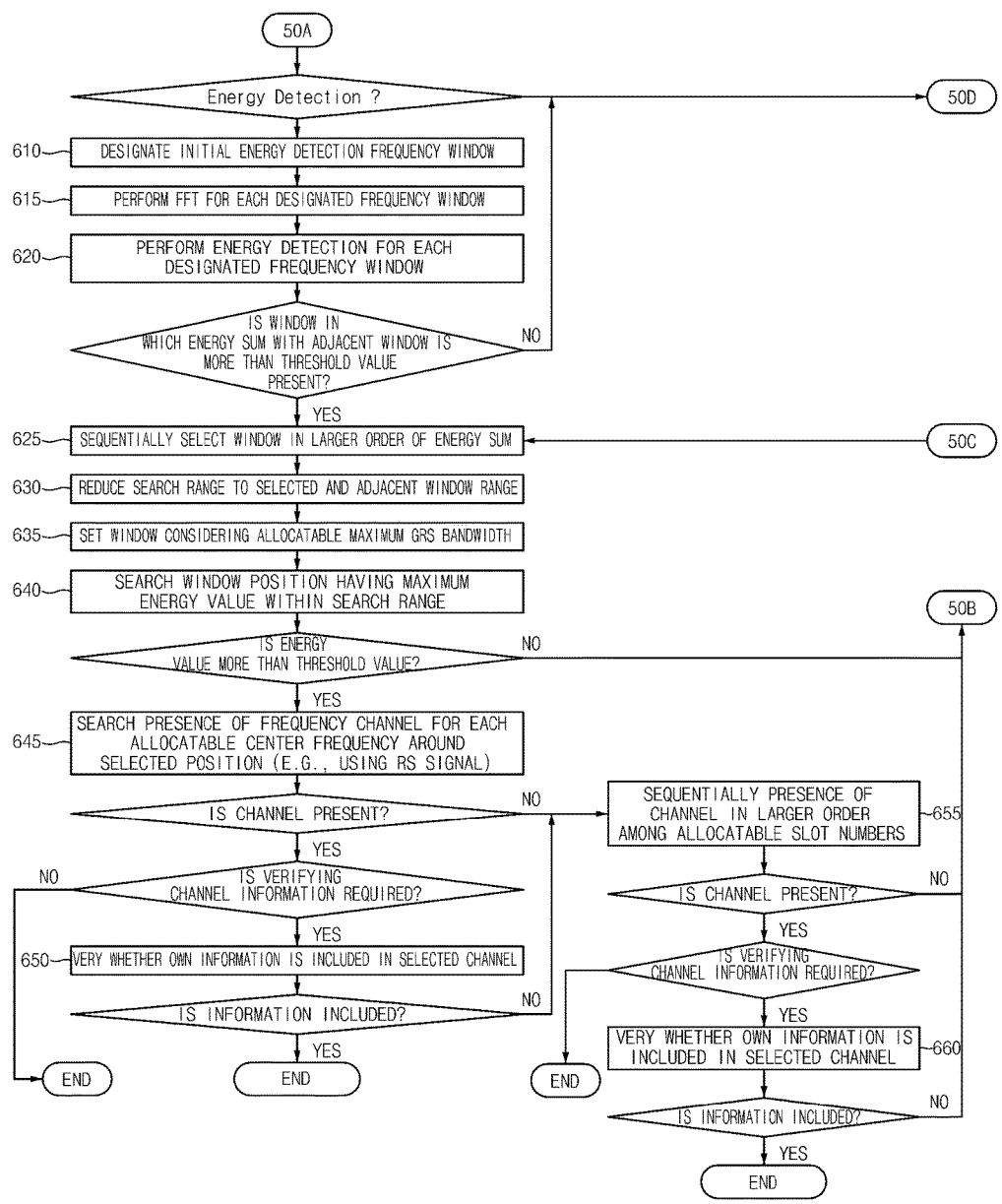
FIG. 5B is a continued flowchart of FIG. 5A.
Figure 5C:
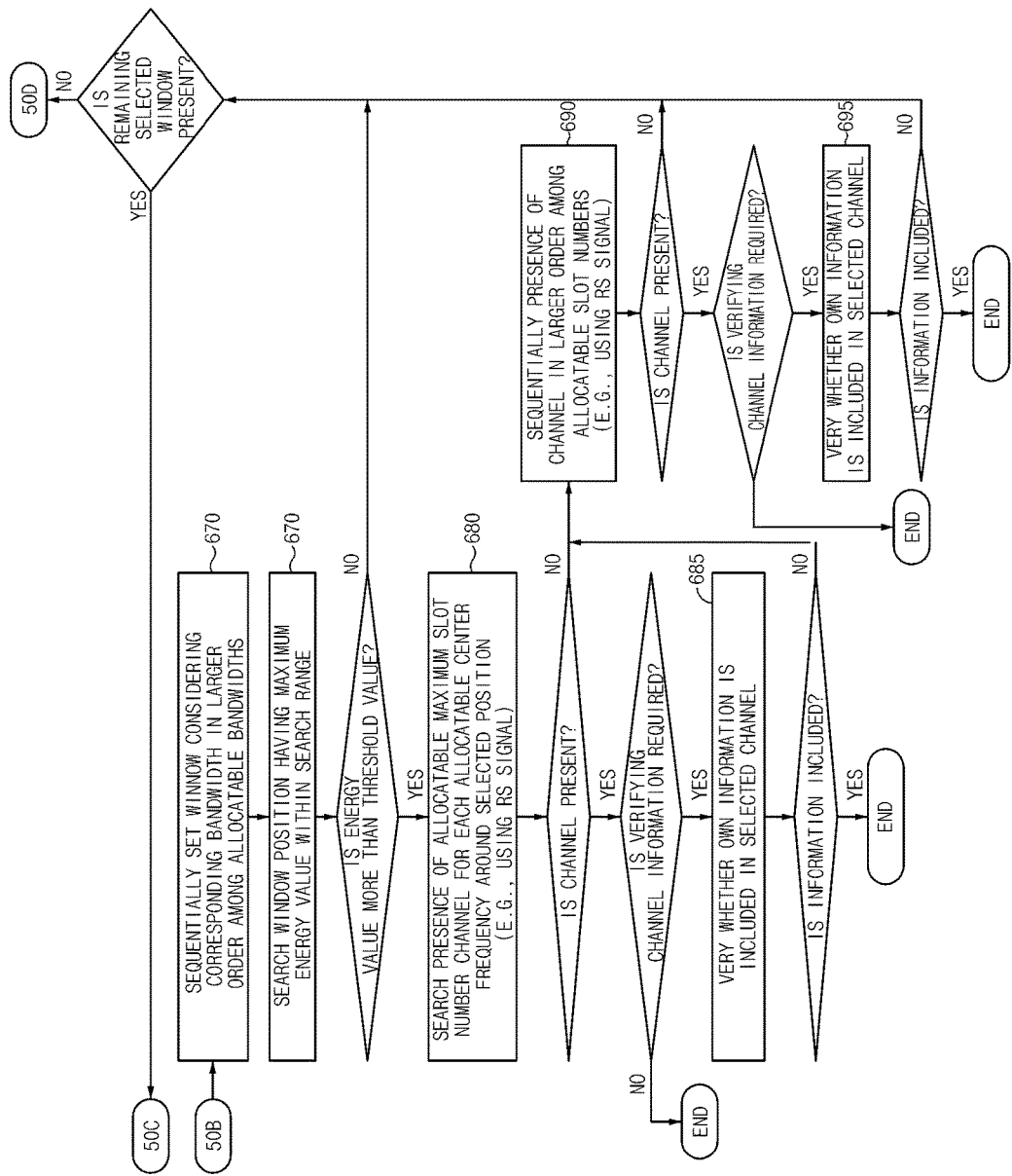
FIG. 5C is a continued flowchart of FIG. 5B.

FIG. 5A is a flowchart for describing a process in which a UA searches an uplink frequency, a frequency bandwidth, and a time slot in an initial CNPC channel process (P2P type and P2MP type) in a UAS according to an exemplary embodiment of the present invention. FIG. 5B is a continued flowchart of FIG. 5A. FIG. 5C is a continued flowchart of FIG. 5B.

In order to reduce the searching time, when the UA has the GPS and has the channel allocation DB of the frequency (a primary channel and the like) list acquired in the SA, the frequency list (the searching candidate band) which may be allocated in an area where the current UA is located through the GPS and the like may be verified through the DB (510).

If the UA knows that the GRS forming the CNPC link is the P2P type or the P2MP type (for example, in the case of pre-setting), only the allocable CNPC channel form is searched according to the P2P type and the P2MP type. In the case where it is not known whether the GRS is the P2P type or the P2MP type (for example, in the case of non-presetting), the UA first searches the allocable CNPC channel (the searching candidate band) for the P2P type in which the number of allocable channel forms is small (see FIG. 5A). However, in some cases, the UA may first search the allocable CNPC channel form for the P2MP type (see FIG. 5B/5C).

First, referring to FIG. 5A, with respect to the P2P type of the GRS, the UA starts energy detection for the energy (the signal size) of the receiving signal for previously known candidate bands, with respect to the entire band for the CNPC in the case of the blind detection, in order to reduce the searching range. The UA designates a window by a bandwidth unit in the initial energy detection (515), takes fast Fourier transform (FFT) for each frequency bandwidth window in order to show a frequency domain signal characteristic (520), and then performs energy detection for each frequency bandwidth window in the frequency domain (525). Herein, the window size is larger than the allocable unit channel bandwidth of the GRS.

Next, since the signal of the GRS may be present throughout two adjacent windows, the detection energy sum of the adjacent window and the current window exceeds a threshold value to find the window location in the current window. In this case, the window is sequentially selected from the window location where the energy sum is large (535), and the searching range is reduced to the adjacent window to the corresponding window (540). In addition, within the reduced searching range, a frequency bandwidth window is set by a predetermined bandwidth unit by considering a maximum allocable bandwidth (545) and a window location having a maximum energy value is searched through the signal analysis in the frequency domain after the FFT (550) to select the allocable central frequency.

When the maximum energy value of 550 exceeds the threshold value, whether the channel is present is searched for each allocable central frequency around the selected corresponding window location (555). The UA needs to find the allocable uplink frequency bandwidth between the GRS and the UA in the allocable central frequency. To this end, the UA assumes that the GRS transmits the uplink signal with the bandwidth for each allocable uplink frequency bandwidth and verifies whether the corresponding bandwidth signal is present by using the frame structure (e.g. an RS signal) in the bandwidth to verify the uplink channel frequency and the bandwidth. The UA verifies whether the information transmitted to the uplink channel from the GRS is present in the corresponding uplink channel to verify the downlink channel information included therein (560).

When the maximum energy value of 550 does not exceed the threshold value, within the above reduced searching range (540), a frequency bandwidth window is sequentially set by a predetermined bandwidth unit by considering a corresponding bandwidth in a larger order of allocable bandwidths (565) and a window location having a maximum energy value is searched through the signal analysis in the frequency domain after the FFT (570) to select the allocable central frequency.

When the maximum energy value of 570 exceeds the threshold value, whether the channel is present is searched for each allocable central frequency around the selected corresponding window location (575). The UA needs to find the uplink frequency bandwidth between the GRS and the UA in the allocable central frequency. To this end, the UA assumes that the GRS transmits the uplink signal with the bandwidth for each allocable bandwidth and verifies whether the corresponding bandwidth signal is present by using the frame structure (e.g. an RS signal) in the bandwidth to verify the uplink channel frequency and the bandwidth. The UA verifies whether the information transmitted to the uplink channel from the GRS is present in the corresponding uplink channel to verify the downlink channel information included therein (580).

Referring to FIG. 5B/5C, with respect to the P2MP type of the GRS, the UA progresses similarly to the process in FIG. 5A.

That is, in FIG. 5B, processes 610 to 650 are similar to the processes 515 to 560 in FIG. 5A. However, when the maximum energy value of 640 exceeds the threshold value, whether the channel is present is searched for each allocable central frequency around the selected corresponding window location and whether a channel having a maximum slot number is present is searched (645). The UA needs to find the uplink frequency bandwidth between the GRS and the UA in the allocable central frequency. To this end, the UA assumes that the GRS transmits the uplink signal with the bandwidth for each allocable bandwidth and verifies whether the corresponding bandwidth signal is present by using the frame structure (e.g. an RS signal) in the bandwidth to verify the uplink channel frequency and the bandwidth. In this case, when there is no channel having a maximum slot number, the UA searches whether the channel is present in a large order of the allocable slot number (655), and verifies whether information transmitted to the uplink channel from the GRS is present in the corresponding uplink channel to verify the downlink channel information included therein (660).

In FIG. 5C, processes 670 to 685 are similar to the processes 565 to 580 in FIG. 5A. However, when the maximum energy value of 675 exceeds the threshold value, whether the channel is present is searched for each allocable central frequency around the selected corresponding window location and whether a channel having a maximum slot number is present is searched (680). The UA needs to find the uplink frequency bandwidth between the GRS and the UA in the allocable central frequency. To this end, the UA assumes that the GRS transmits the uplink signal with the bandwidth for each allocable bandwidth and verifies whether the corresponding bandwidth signal is present by using the frame structure (e.g. an RS signal) in the bandwidth to verify the uplink channel frequency and the bandwidth. In this case, when there is no channel having a maximum slot number, the UA searches whether the channel is present sequentially in a large order of the allocable slot number (690), and verifies whether information transmitted to the uplink channel from the GRS is present in the corresponding uplink channel to verify the downlink channel information included therein (695).

Figure 6:
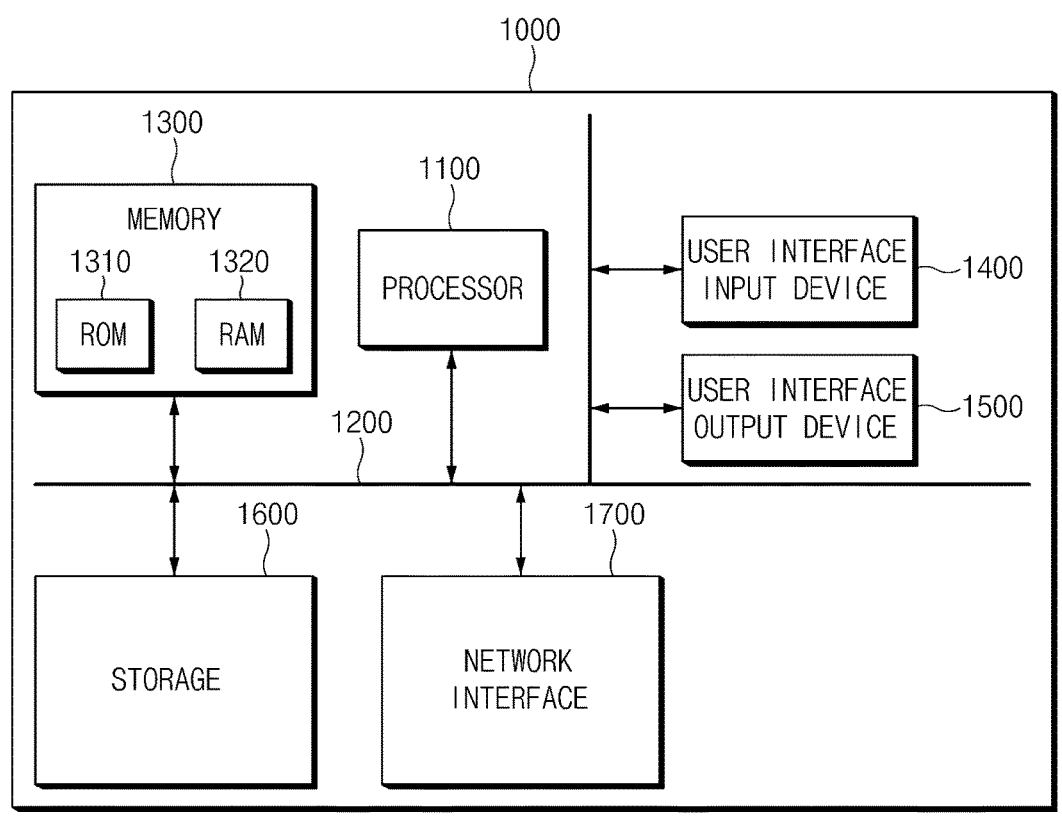
FIG. 6 is a diagram for describing one example of a method for implementing a spectrum authority (SA) system, a ground control system (GCS), a ground radio station (GRS), an unmanned aircraft (UA), and the like of a UAS according to an exemplary embodiment of the present invention.

FIG. 6 is a diagram for describing one example of a method for implementing a spectrum authority (SA) system, a ground control system (GCS), a ground radio station (GRS), an unmanned aircraft (UA), and the like of a UAS according to an exemplary embodiment of the present invention. The spectrum authority (SA) system, the ground control system (GCS), the ground radio station (GRS), the unmanned aircraft (UA), and the like of the UAS according to the exemplary embodiment of the present invention may be implemented by hardware, software, or a combination thereof for CNPC channel setting and manual connection establishment. For example, the spectrum authority (SA) system, the ground control system (GCS), the ground radio station (GRS), the unmanned aircraft (UA), and the like may be implemented as a computing system 1000 illustrated in FIG. 6.

The computing system 1000 may include at least one processor 1100, a memory 1300, a user interface input device 1400, a user interface output device 1500, a storage 1600, and a network interface 1700 connected through a bus 1200. The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in the user terminal. As yet another method, the processor and the storage medium may reside in the user terminal as individual components.

As described above, the method for communication channel setting and connection establishment for the CNPC system in the unmanned aircraft systems (UAS) dynamically supports CNPC channel setting between a ground radio station (GRS) and an unmanned aircraft (UA) and CNPC link connection among a ground control system (GCS), the ground radio station (GRS), and the unmanned aircraft (UA), and as a result, the SA may manage all frequencies without fixedly allocating all of the frequencies to a specific CNPC system and dynamically allocates all of the frequencies only when operating a UAS CNPC system and immediately recovers after completing the operation of the UAS CNPC system to allow another UAS CNPC system to reuse the frequencies, thereby increasing limited CNPC frequency utilization. Further, the present invention can be implemented to be applied even in a next-generation upward TDMA or downward FDMA based P2MP type UA controlling communication system including multiple UA supporting GRSs as well as a P2P type in the related art.

The above description just illustrates the technical spirit of the present invention and various changes and modifications can be made by those skilled in the art to which the present invention pertains without departing from an essential characteristic of the present invention.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirit in the equivalent range thereto is intended to be embraced by the scope of the present invention.

What is claimed is:

1. A method for communication channel setting and connection establishment in an unmanned aircraft system including a spectrum authority (SA) system, a ground control system (GCS), a ground radio station (GRS), and an unmanned aircraft (UA), the method comprising:
   supporting, by the SA system, dynamic channel allocation and management in a database for efficiently allocating and managing a limited frequency resource for controlling the unmanned aircraft; and
   initially setting and establishing communication connection of a control non-payload communication channel allocated according to the dynamic channel allocation among the GCS, the GRS, and the UA,
   wherein a point-to-point (P2P) type in which the GCS directly communicates with the UA or a point-to-multipoint (P2MP) type in which the GCS communicates with the UA through a plurality of GRSs interlocked on a network is supported, and
   wherein the SA system dynamically allocates frequencies only when operating an unmanned aircraft system (UAS) control and non-payload communication (CNPC) system and immediately recovers after completing an operation of the UAS CNPC system to allow another UAS CNPC system to reuse the frequencies.

2. The method of claim 1, wherein in the initially setting and the establishing of the communication connection, a control and non-payload communication (CNPC) channel of the GRS is set by the GCS, and the CNPC channel of the UA is set by the GCS or a pilot or an operation manager receives information from the GCS through a terminal and directly inputs the corresponding information in the UA to the CNPC channel.

3. The method of claim 2, wherein the initially setting and the establishing of the communication connection includes
   requesting, by the GCS, an access to the GRS,
   determining, by the GRS, whether the GCS is valid to respond to an access acceptance to the valid GCS,
   determining, by the GCS, whether the GRS is valid to request CNPC channel setting to the valid GRS,
   setting, by the GRS, the CNPC channel and transmitting a setting completion message to the GCS,
   requesting, by the GCS or a terminal of a pilot or an operation manager, an access to the UA,
   determining, by the UA, whether the GCS or the terminal of the pilot or the operation manager is valid and responding to the access acceptance to the corresponding device when the GCS or the terminal of the pilot or the operation manager is valid,
   determining, by the corresponding device, whether the UA is valid to request the CNPC channel setting to the valid UA, setting, by the UA, the CNPC channel and transmitting the setting completion message to the corresponding device,
   requesting, by the GCS, CNPC communication link connection to the GRS, requesting, by the GRS, the communication link connection to the UA through the allocated CNPC channel,
   determining, by the UA, whether the GCS and the GRS requesting the link connection are valid to accept the connection to the valid GRS through the allocated CNPC channel, and accepting, by the GRS verifying the connection acceptance, the connection to the GCS.

4. The method of claim 3, wherein the initially setting and the establishing of the communication connection further includes
   requesting, by the UA, the CNPC communication link connection to the GRS through the allocated CNPC channel,
   requesting, by the GRS, the communication link connection to the GCS, determining, by the GCS, whether the GCS and the UA requesting the link connection are valid to accept the connection to the valid GRS, and
   accepting, by the GRS verifying the connection acceptance, the connection to the UA through the allocated CNPC channel.

5. The method of claim 4, wherein for any one of the GRS, the UA, and the GCS, or the terminal of the pilot or the operation manager to communicate with the other one among remaining components, a transmission message includes identification information thereof so as to be a basis for determining whether any one is valid and the transmissions message includes identification information of the other one so as for only the other one which is a counter entity to verify related information.

6. The method of claim 4, wherein
   when the GCS or the terminal of the pilot or operation manager requests the CNPC channel setting to the valid UA, the transmission message includes allocation channel information, GRS ID information, and destination UA ID information,
   when the GCS requests the CNPC communication link connection to the GRS, the transmission message includes the destination UA ID information,
   when the GRS requests the communication link connection to the UA through the allocated CNPC channel, the transmission message includes the source GCS ID information,
   when the UA accepts the connection to the valid GRS through the allocated CNPC channel, the transmission message includes the destination GCS ID information, when the GRS accepts the connection to the GCS, the transmission message includes the source UA ID information, when the UA requests the allocated CNPC communication link connection to the GRS, the transmission message includes the destination GCS ID information, when the GRS requests the communication link connection to the GCS, the transmission message includes the source UA ID information, when the GCS accepts the allocated connection to the valid GRS, the transmission message includes the destination UA ID information, or when the GRS accepts the connection to the UA through the allocated CNPC channel, the transmission message includes the source GCS ID information.

7. The method of claim 1, wherein in the initially setting and the establishing of the communication connection, a control and non-payload communication (CNPC) channel of the GRS is set by the GCS, and the CNPC channel setting between the UA and the GRS is attempted through a common channel or the allocated CNPC channel by the GRS which receives a request for the communication channel setting and connection establishment of the GCS or attempted by the GRS which receives a request for the communication channel setting and connection establishment of the UA through a common channel.

8. The method of claim 7, wherein the initially setting and the establishing of the communication connection includes requesting, by the GCS, the access to the GRS, determining, by the GRS, whether the GCS is valid to respond to the access acceptance to the valid GCS, determining, by the GCS, whether the GRS is valid to request the CNPC channel setting to the valid GRS, setting, by the GRS, the CNPC channel and transmitting the setting completion message to the GCS, requesting, by the GCS, the CNPC communication link connection to the GRS, providing, by the GRS, channel allocation information and source GCS ID information to the UA through the allocated CNPC channel or the common channel and requesting the communication link connection, determining, by the UA, whether the GRS and the GCS are valid to accept the communication link connection to the valid GRS, and determining, by the GRS, whether the UA which accepts the connection is valid and accepting the communication link connection to the GCS.

9. The method of claim 7, wherein the initially setting and the establishing of the communication connection includes requesting, by the GCS, the access to the GRS, determining, by the GRS, whether the GCS is valid to respond to the access acceptance to the valid GCS, determining, by the GCS, whether the GRS is valid to request the CNPC channel setting to the valid GRS, setting, by the GRS, the CNPC channel and transmitting the setting completion message to the GCS, requesting, by the GCS, the CNPC communication link connection to the GRS, requesting, by the GRS, the communication link connection to the UA without providing the CNPC channel allocation information, determining, by the UA, whether the GRS is valid to request the CNPC channel allocation information to the valid GRS, determining, by the GRS, whether the UA requesting the CNPC channel allocation information is valid to provide the CNPC channel allocation information and the source GCS ID information to the valid UA, determining, by the UA, whether the GCS is valid to accept the communication link connection to the GRS, and accepting, by the GRS, the communication link connection to the GCS.

10. The method of claim 7, wherein the initially setting and the establishing of the communication connection includes requesting, by the GCS, the access to the GRS, determining, by the GRS, whether the GCS is valid to respond to the access acceptance to the valid GCS, determining, by the GCS, whether the GRS is valid to request the CNPC channel setting to the valid GRS, setting, by the GRS, the CNPC channel and transmitting the setting completion message to the GCS, requesting, by the UA, the CNPC communication link connection to the GRS through the common channel, determining, by the GRS, whether the UA is valid to provide the CNPC channel allocation information to the valid UA through the common channel, determining, by the UA, whether the GRS is valid to respond to channel setting completion to the valid GRS through the common channel or the allocation channel, requesting, by the GRS, the CNPC communication link connection to the GCS, determining, by the GCS, whether the UA is valid to accept the link connection to the GRS, and accepting, by the GRS, the link connection to the UA through the allocated CNPC channel.

11. The method of claim 7, wherein for any one of the GRS, the UA, and the GCS, or the terminal of the pilot or the operation manager to communicate with the other one among remaining components, a transmission message includes identification information thereof so as to be a basis for determining whether any one is valid and the transmissions message includes identification information of the other one so as for only the other one which is a counter entity to verify related information.

12. The method of claim 7, wherein when the GCS requests the CNPC channel setting to the GRS, the transmission message includes the allocation channel information and the destination UA ID information, when the GCS requests the CNPC communication link connection to the GRS, the transmission message includes the destination UA ID information, when the GRS requests the CNPC communication link connection to the UA, the transmission message includes the channel allocation information, the source GCS ID information, and the destination UA ID information, when the UA accepts the connection to the GRS, the transmission message includes the destination GCS ID information, when the GRS accepts the connection to the GCS, the transmission message includes the source UA ID information, when the UA requests the link connection to the GRS, the transmission message includes the destination GCS ID information, when the GRS requests the communication link connection to the GCS, the transmission message includes the source UA ID information, when the GCS accepts the connection to the GRS, the transmission message includes the destination UA ID information, or when the GRS accepts the connection to the UA, the transmission message includes the source GCS ID information.

13. The method of claim 7, wherein
two or more common uplink and downlink frequency channels are designated and managed by the SA in order to avoid interference among the GRSs which are simultaneously initially set,
a common time slot is designated at an uplink frequency of multiple UA supporting GRSs, or
a common time slot is designated at an uplink frequency of multiple UA supporting GRSs and two or more common downlink frequency channels are designated and managed by the SA system in order to avoid the interference among the GRSs which are simultaneously initially.

14. The method of claim 7, wherein
an initial setting common channel is set with a minimum bandwidth among channel bandwidths which are applicable at a center frequency of the allocated CNPC channel regardless of the size of the bandwidth of the allocated CNPC channel, or
an initial setting common channel is set with not the number of time slots allocated at an uplink frequency of the multiple UA supporting GRSs but the minimum number of slots among the number of applicable channel slots.

15. The method of claim 1, wherein in the initially setting and the establishing of the communication connection, a search range is reduced through energy detection and it is verified whether the channel is present with respect to an allocatable bandwidth, the bandwidth and the time slot position, or the bandwidth and the time slot number and the time slot position for each center frequency allocatable within the reduced search range, and as a result, the UA does not receive uplink channel allocation information through the GRS or GCS, but directly searches the frequency, the bandwidth, the time slot number, or the time slot position through an uplink signal of the GRS.

16. The method of claim 15, wherein the initially setting and the establishing of the communication connection includes
verifying, by the UA, a channel list allocatable at a present position by referring to the database to set a search candidate band when possessing a GPS and a channel allocation database,
performing the energy detection in a full band or the search candidate band, selecting the center frequency allocatable through the energy detection,
verifying whether the channel is present for each uplink frequency bandwidth allocatable between the GRS and the UA at the allocatable center frequency, and
verifying downlink channel information by verifying whether information of the UA itself is present in the verified channel.

17. The method of claim 16, wherein
the performing of the energy detection includes
designating an initial energy detection frequency window,
performing FFT for each designated frequency window,
performing the energy detection for each designated frequency window, and
verifying a frequency window in which an energy sum with an adjacent frequency window is more than a threshold value, and the selecting of the center frequency includes
sequentially selecting frequency windows in an order in which the energy sum is the larger, and
reducing the search range to ranges of the selected frequency window and the adjacent frequency window.

18. The method of claim 17, comprising:
after the reducing of the search range, setting a frequency window considering an allocatable maximum bandwidth;
selecting a window position having a maximum energy value within the search range; searching whether the frequency channel is present for each allocatable center frequency in the vicinity of the selected window position;
determining whether the maximum energy value is more than the threshold value and thereafter, sequentially setting, when the maximum energy value is not more than the threshold value, the windows sequentially considering the corresponding bandwidth in the order in which the allocatable bandwidth is the larger, and selecting the window position having the maximum energy value within the corresponding search range;
verifying whether the channel is present for each uplink frequency bandwidth allocatable between the GRS and the UA for each allocatable center frequency; and
verifying the downlink channel information by verifying whether the information of the UA itself is present in the verified channel.

19. The method of claim 16, wherein the initially setting and the establishing of the communication connection further includes
verifying whether there is the information of the UA itself in the verified channel according to the presence of the channel,
sequentially setting, when the information of the UA itself is not included, the windows considering the corresponding bandwidth in the order in which the allocable bandwidth is the larger, and
selecting the window position having the maximum energy value within the corresponding search range,
revivifying whether the channel is present for each uplink frequency bandwidth allocatable between the GRS and the UA for each allocatable center frequency, and
verifying the downlink channel information by verifying whether the information of the UA itself is present in the verified channel.

20. The method of claim 16, wherein the initially setting and the establishing of the communication connection includes
verifying whether a channel having the maximum number of allocatable slots is present in the verifying of the presence of the channel and verifying whether there is the information of the UA itself in the verified channel,
reviving whether the uplink channel allocatable between the GPS and the UA is present sequentially in the order in which the number of allocatable slots is the larger when the information of the UA itself is not included, and
verifying the downlink channel information by verifying whether the information of the UA itself is present in the verified channel.

* * * * *